(12) United States Patent
Yokota et al.

(10) Patent No.: US 7,720,358 B2
(45) Date of Patent: May 18, 2010

(54) RECORDING SYSTEM, RECORDING METHOD AND RECORDING DEVICE

(75) Inventors: Teppei Yokota, Chiba (JP); Michiaki Yoneda, Kanagawa (JP)

(73) Assignee: Sony Corporation (JP)

( * ) Notice: Subject to any disclaimer, the term of this patent is extended or adjusted under 35 U.S.C. 154(b) by 993 days.

(21) Appl. No.: 11/200,500

(22) Filed: Aug. 9, 2005

(65) Prior Publication Data

US 2006/0034587 A1 Feb. 16, 2006

(30) Foreign Application Priority Data

Aug. 11, 2004 (JP) ............................ P2004-234346

(51) Int. Cl.
*H04N 5/00* (2006.01)
*H04N 7/26* (2006.01)
*H04N 5/50* (2006.01)
*H04N 5/44* (2006.01)

(52) U.S. Cl. ..................... 386/95; 386/111; 386/112; 348/732; 348/725

(58) Field of Classification Search .................. 386/95, 386/111–112; 348/732, 725
See application file for complete search history.

(56) References Cited

U.S. PATENT DOCUMENTS

2004/0051816 A1* 3/2004 Ikeguchi ..................... 348/732
2007/0092203 A1* 4/2007 Iwata et al. .................. 386/83

FOREIGN PATENT DOCUMENTS

JP 7-154705 A 6/1995

| JP | 09-130716 A | 5/1997 |
| JP | 2000-285639 A | 10/2000 |

(Continued)

OTHER PUBLICATIONS

Machine Traslation of P2003-199004; Jul. 2003, Okada Okiyuki.*

*Primary Examiner*—Thai Tran
*Assistant Examiner*—Daquan Zhao
(74) *Attorney, Agent, or Firm*—Lerner, David, Littenberg, Krumholz & Mentlik, LLP

(57) ABSTRACT

A recording system is constructed with at least first and second recording devices, both of which are connected to a network and have channel selection functions and functions of reserving the recording of broadcast program information forming a broadcast program. The first recording device includes a first memory for storing recording reservation information from a user, a judgment circuit for judging whether the recording reservation information is for a receivable broadcast channel, and a sending circuit for producing a recording reservation request containing the recording reservation information and for sending it to the network when it is judged that the recording reservation information is not for a receivable broadcast channel. The second recording device includes a circuit for selecting a broadcast channel other than a channel which can be received by the first recording device, a second memory for storing the recording reservation information, a receiving circuit for receiving information transmitted through the network, a reservation request receiving circuit for storing the recording reservation information corresponding to the recording reservation request when the information received by the receiving circuit is a recording reservation request from the first recording device, and a reservation recording control circuit for recording in a recording medium the program information forming the broadcast program corresponding to the recording reservation information stored in the second memory.

9 Claims, 13 Drawing Sheets

FOREIGN PATENT DOCUMENTS

| | | |
|---|---|---|
| JP | 2002-218364 A | 8/2002 |
| JP | 2002-354365 A | 12/2002 |
| JP | 2003-116085 A | 4/2003 |
| JP | 2003-199004 A | 7/2003 |
| JP | P2003-199004 * | 7/2003 |
| JP | 2003-319363 A | 11/2003 |
| JP | 2004-023326 A | 1/2004 |

* cited by examiner

FIG. 6A

RECEIVING PERFORMANCE INFORMATION

| KIND OF BROADCASTING | YES OR NO |
|---|---|
| ANALOG TERRESTRIAL WAVE | YES |
| DIGITAL TERRESTRIAL WAVE | NO |
| BS | NO |
| CS | NO |

FIG. 6B

INFORMATION OF RECEIVABLE STATION
PLACE OF USE (TOKYO)

| RECEIVABLE STATION | |
|---|---|
| VHF | UHF |
| 01 | 43 TV OO |
| 03 | ⋮ |
| 04 | |
| 06 | |
| 08 | |
| 10 | |
| 12 | |
| | |

FIG. 7

LIST OF COOPERATING HARD DISC RECORDERS ON WIDE-AREA NETWORK

| COOPERATING HARD DISC RECORDER ID | ADDRESS OF INSTALLED LOCATION | RECEIVABLE STATION | TELEPHONE NUMBER | OWNER | THE OTHERS |
|---|---|---|---|---|---|
| XXXXX | HOKKAIDO | TV○○<br>XXTV<br>△△BROADCASTING | 1234-56-7890 | ○○○ | xxxxx |
| YYYYY | OKINAWA-KEN | △△BROADCASTING<br>○□TV<br>TVX△ | 5678-90-1234 | □□□ | yyyyy |
| ..... | ..... | ..... | ..... | ..... | ..... |

REPRODUCTION PROCESSING (FORWARDING ADDRESS) OF CONTENTS RECORDED BY VICARIOUSLY EXECUTED VIDEO RECORDING PROCESSING

TRANSFER PROCESSING OF CONTENTS RECORDED BY VICARIOUSLY EXECUTED VIDEO RECORDING PROCESSING

RECORDING SYSTEM, RECORDING METHOD AND RECORDING DEVICE

CROSS-REFERENCE TO RELATED APPLICATIONS

The present application claims priority from Japanese Patent Application No. JP 2004-234346 filed on Aug. 11, 2004, the disclosure of which is hereby incorporated by reference herein.

BACKGROUND OF THE INVENTION

The present invention relates to a recording system constructed with a plurality of recording devices such as, for example, DVD (Digital Versatile Disc) recorders or a hard disc recorders, and a recording method and a recording device used in the recording system.

A video recording device constructed with, for example, a combination of a DVD recorder and a HDD (Hard Disc Drive) and further equipped with a network connection terminal such as an Ethernet (registered trademark) terminal, has been used widely. A good many of such recording devices (video recording devices) are designed such that a reservation of program recording can be easily done through a GUI (Graphical User Interface), which can be classified under broadcasting channel or program genre, while displaying an electronic program information called EPG (Electronic Program Guide) on a display screen of a television receiver (monitor receiver).

For example, JP-A-2002-354365 discloses a technique for making a rapid selection of a desired program possible with using EPG and JP-A-2000-285639 discloses a technique for efficiently searching contents, whose reservation of recording is made and which is recorded by using EPG. By using these techniques, an effective utilization of EPG is promoted.

Information of digital BS (Broadcast Satellite) broadcastings and digital CS (Communications Satellite) broadcastings and other pay broadcastings are usually inserted into EPG, regardless of functions of tuners used by individual users and broadcasting channels, which can be selected in areas in which the tuners are positioned.

When nothing is made for such matter, a reservation of video recording for, for example, BS broadcasting or CS broadcasting becomes possible in a recording device having no channel selection function for BS or CS broadcasting. Namely, there may be a case where, though a broadcasting signal is intrinsically not selectable by the recording device and, so, can not be recorded by the recording device, the reservation of video recording of a program transmitted by the broadcasting signal becomes possible in the recording device. However, it is not realistic to realize a recording device, which can receive all of broadcasting programs inserted into EPG, due to heavy burden in both hardware and manufacturing cost.

In view of this, it is usual that, when a reservation of video recording of a TV broadcast program on a channel, which can not be selected by a TV receiver of a user, is made, a warning message, etc., indicating impossibility of reservation of video recording is output to urge the user to change an input operation for reservation. In such case, the user can clearly know the impossibility of reservation of the channel, so that confusion of the user can be avoided.

However, the fact that, though a broadcast program exists in a displayed EPG, reservation of recording thereof is impossible due to impossibility of selection of a broadcasting signal providing the program may be understood by users as bad performance of the recording device.

Even in a case where EPG is not used, there may be a case where a reservation of video recording is impossible due to impossibility of selection of the broadcasting signal providing the broadcasting program or, even if the reservation of video recording is possible, it is practically impossible to record an aimed broadcast program, as in the case in which EPG is used.

SUMMARY OF THE INVENTION

In view of the above mentioned reasons, an object of the present invention is to provide an easy-to-use recording system of a broadcasting signal, which is easily used by users while compensating for the functions of each of a plurality of recording devices, by operatively connecting the recording devices, which are usually used individually, to a network, and to provide a method and a device for use in the recording system.

A recording system according to an embodiment of the present invention is constructed with a plurality of recording devices, each of which has a function of receiving broadcast signals and a function of recording program information forming a broadcast program. One of the recording devices, which performs a reservation of video recording, includes a reception circuit portion for receiving recording reservation information of a program to be recorded from a user; a first memory for storing the received recording reservation information; a judgment circuit portion for judging whether the received recording reservation information is for a selectable broadcasting channel; and a transmitting circuit portion for producing a recording reservation request containing the recording reservation information and for transmitting the recording reservation request to the network when the judgment circuit portion judges that the received recording reservation information is for a broadcast channel other than a selectable broadcast channel. Another one of the recording devices includes a first receiving circuit portion capable of receiving the broadcast channel other than the selectable broadcast channel; a second memory for storing recording reservation information; a second receiving circuit portion for receiving information transmitted through the network; a reservation request reception circuit portion for storing the recording reservation information corresponding to the recording reservation request in the second memory when the information received by the second receiving circuit portion is the recording reservation request from the one recording device; and a reservation recording control circuit portion for recording in a recording medium the program information forming the broadcast program corresponding to the recording reservation information recorded in the second memory.

According to this recording system, when a recording device, which directly receives recording reservation information containing at least information of a broadcasting time zone and a broadcasting channel from a user and can not select the broadcasting channel because of a lack of the required function or can not receive a broadcasting signal because of the remoteness of the broadcasting station broadcasting the broadcast signal, makes a recording reservation of the broadcast program, the recording device transfers the recording reservation information to another recording device connected to the network, which can select the broadcasting channel, to cause the another recording device to vicariously execute the recording corresponding to the recording reservation.

Thus, for the reservation of recording of the broadcast program provided by the broadcasting signal, which can not be received by one recording device due to the lack of function thereof or because of the remoteness of a broadcasting station broadcasting the signal, the one recording device can cause another recording device, which can receive the broadcasting signal and which can communicate with the one recording drive through the network, to vicariously perform the recording corresponding to the recording reservation by transferring the reservation information to the another recording device. Therefore, it is possible to realize a recording system for recording broadcast signals which can be used by a user conveniently.

In the recording system according to another embodiment of the present invention, a recording device, which is a requesting recording device requesting another recording device, which is a requested recording device, includes receiving means for receiving program information forming a broadcast program addressed to the requesting recording device and transmitted through the network; and recording processing means for recording the received program information in a recording medium of the requesting recording device; and the requested recording device, which is requested to vicariously perform the reservation, includes a program information transmission circuit portion for transmitting the program information forming the broadcast program recorded in the recording medium of the requested recording device to the requesting recording device under control of the reservation recording control circuit portion when the program information forming the broadcast program of the received broadcasting signal is recorded in the recording medium of the requested recording device.

According to this recording system, when program information such as video data and audio data, which forms the broadcast program, is recorded in the requested recording device according to the recording reservation information transferred from the requesting recording device, it is possible to transfer the program information from the requested recording device to the requesting recording device immediately after the end of the recording operation and to store it in the recording medium of the requesting recording device, so that the recorded program information can be utilized in the requesting recording device independently.

Therefore, the user of the requesting recording device can utilize the program information recorded in the recording medium of the requested recording device by performing the recording of the broadcast program in the requested recording device connected to the network even if the reservation of the broadcast program recording is overlapped with another reservation in the requesting recording device, without any consciousness of the requested recording device. Thus, it becomes possible to create a system for recording broadcasting signals which is used by a user conveniently.

In the recording system according to another embodiment of the present invention, the requesting recording device includes a provision request transmission circuit portion for transmitting to the requested recording device a provision request for the program information forming the recorded broadcast program, which performed a recording according to the recording reservation request from the requesting recording device, and a receiving circuit portion for receiving the program information forming the broadcast program transmitted to the requesting recording device through the network; and the requested recording device includes a program information transmission circuit portion for transmitting to the requesting recording device the program information forming the broadcast program recorded in the recording medium of the requested recording device when the provision request is received.

According to this recording system, program information such as video data and audio data forming the broadcast program is recorded in the requested recording device in accordance with the recording reservation information transferred from the requesting recording device. The requested recording device may provide the recorded program information to the requesting recording device according to a provision request from the requesting recording device.

Therefore, the user of the requesting recording device can, on demand, utilize the program information, which is recorded by the requested recording device in lieu of the requesting recording device. Thus, it maybe possible to effectively utilize the recording medium of the respective recording devices connected to the network. Accordingly, it may be possible to construct a recording system for broadcasting signals which can be used by a user conveniently.

By connecting individual recording devices to the network, a recording device having no BS tuner can be utilized virtually as a recording device having a BS tuner. Therefore, it is possible to realize a recording system in which a plurality of recording devices are operatively connected to each other through the network to compensate the function of each recording device for that of another recording device effectively in cost as well as in energy, such that an inexpensive recording device having a mere network connection terminal and having no BS tuner can be used as if it is a video recording device having a BS tuner.

BRIEF DESCRIPTION OF THE DRAWINGS

FIGS. 6A and 6B show an example of receiving function information and an example of receivable station information, which are stored in a hard disc recorder;

FIG. 7 shows an example of a list of cooperative hard disc recorders on a wide area network, which is stored in the hard disc recorder;

DETAILED DESCRIPTION

An embodiment of each of the recording system, the recoding method and the recording device according to the present invention will be described with reference to the drawings. In the embodiments to be described, the system, the method and the device according to the present invention will be described by using a case where they are applied to the so-called home network system formed within a home.

Home Network System

Figure 1:
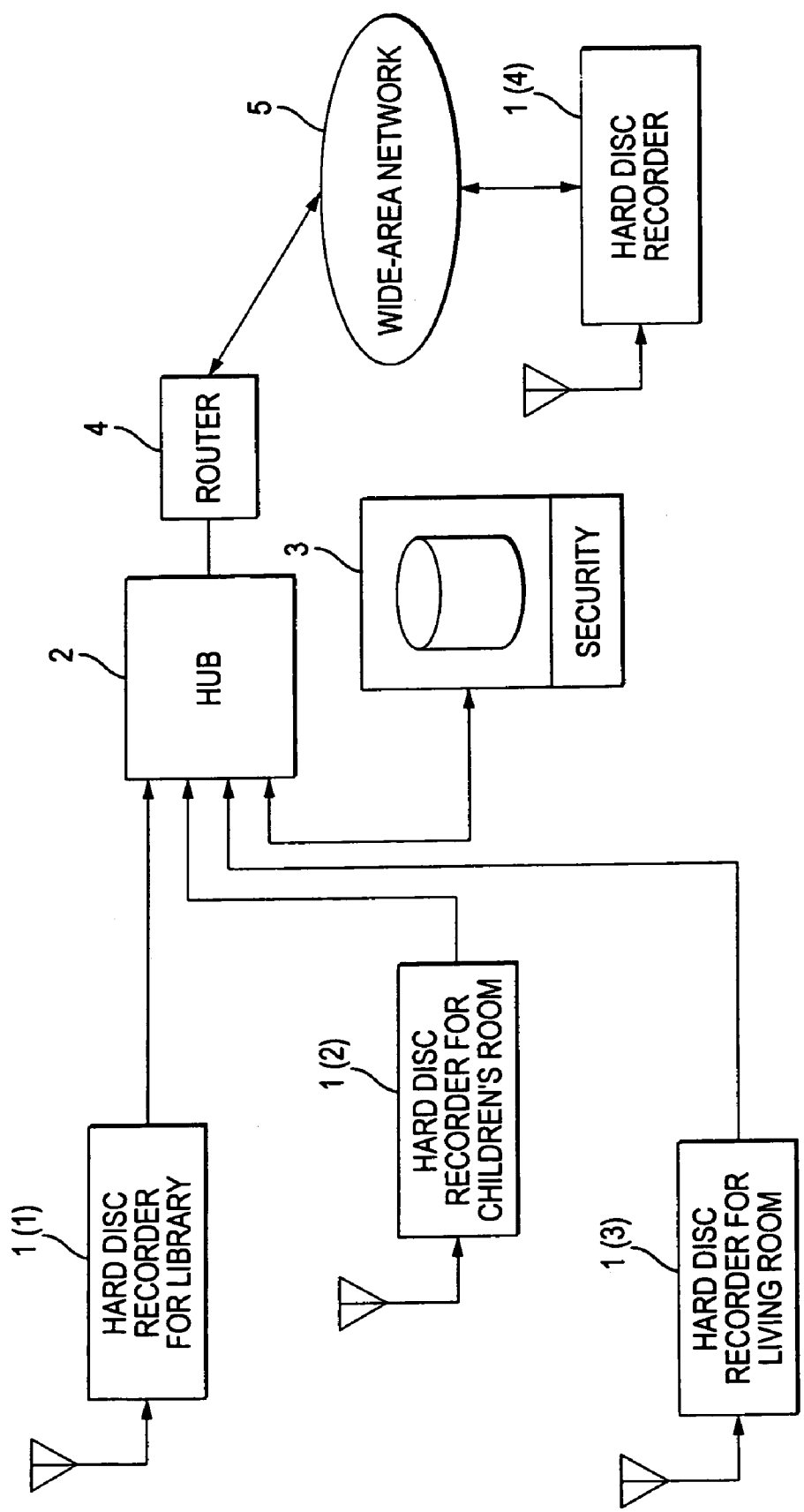
FIG. 1 is a block diagram showing a home network system, which is an embodiment of a recording system of the present invention.

FIG. 1 shows the so-called home network system formed within a home, to which the recording system, the recording method and the recording device according to the present invention are applied. As shown in FIG. 1, the home network system in this embodiment is constructed with hard disc recorders 1(1), 1(2) and 1(3), which are recording devices (video recorders) having receiving function for television broadcasting and allocated in respective three different rooms, that is, a library, a children's room and a living room of the home.

In this case, the hard disc recorder 1(3) placed in the living room is commonly used by family and can utilize, in addition to analog terrestrial television broadcasting signals, BS digital broadcasting signals and CS digital broadcasting signals by selecting any of the channels. The hard disc recorders 1(1) and 1(2) provided in the library and the children's room are for specific persons since interests and hobbies of broadcast program or purposes of use thereof are different. As such, it is a recent tendency that a plurality of hard disc recorders, etc., dedicated to respective family members are provided in a home.

These hard disc recorders 1(1), 1(2) and 1(3) are connected to a hub (indicated by "HUB" in FIG. 1) 2 so that the family members can communicate with each other through the hub. Therefore, the home network system constitutes a LAN (Local Area Network) system of Ethernet (registered trademark) type.

A server 3 is also connected to the hub 2. The server 3 is equipped with a large capacity memory such as hard disc, which stores contents of such as television broadcast programs and music, and can provide contents requested from client devices such as hard disc recorders or personal computers in respective rooms thereto. Further, the server 3 has the so-called security function of, for example, collection of information from respective devices connected to the LAN and detection of abnormal situation on the basis of the collected information.

The respective devices connected to the LAN can exchange information of external devices such as hard disc recorders and personal computers, which are connected to a wide-area network 5 through the hub 2 and a router 4 and the wide-area network such as a telephone network or an internet network. Therefore, the respective hard disc recorders 1(1), 1(2) and 1(3) located in the home in Tokyo can communicate with a hard disc recorder 1(4) provided in a home of a local relative, acquaintance or friend in, for example, Hokkaido, Okinawa, etc., by connecting the hard disc recorder to a communication path.

Each of the respective hard disc recorders 1(1), 1(2) and 1(3), which constitute the home network system in this embodiment, can update its own firmware through the LAN. Further, in a case where one of the hard disc recorders, which receives reservation information of video recording (recording reservation information), if unable to select a broadcasting signal channel of a broadcasting signal indicated by the reservation information of video recording due to lack of its function or geographical remoteness of a broadcasting station thereof, it is possible to oblige a recording device, which is possible to select the broadcasting signal channel of an aimed program, to execute a video recording corresponding to the reservation of video recording, as will be described in detail later.

Constructive Example of Hard Disc Recorder

Now, a construction and an operation of the hard disc recorder used in the home network of this embodiment. As described previously, first recorders, namely, the hard disc recorders 1(1), 1(2) and 1(4), have only tuners for analog terrestrial television broadcasting, respectively have no BS/CS tuner, and a second recorder, namely, the hard disc recorder 1(3), has a tuner for analog terrestrial television broadcasting as well as a BS/CS tuner.

Hard Disc Recorder without BS/CS Tuner

Figure 2:
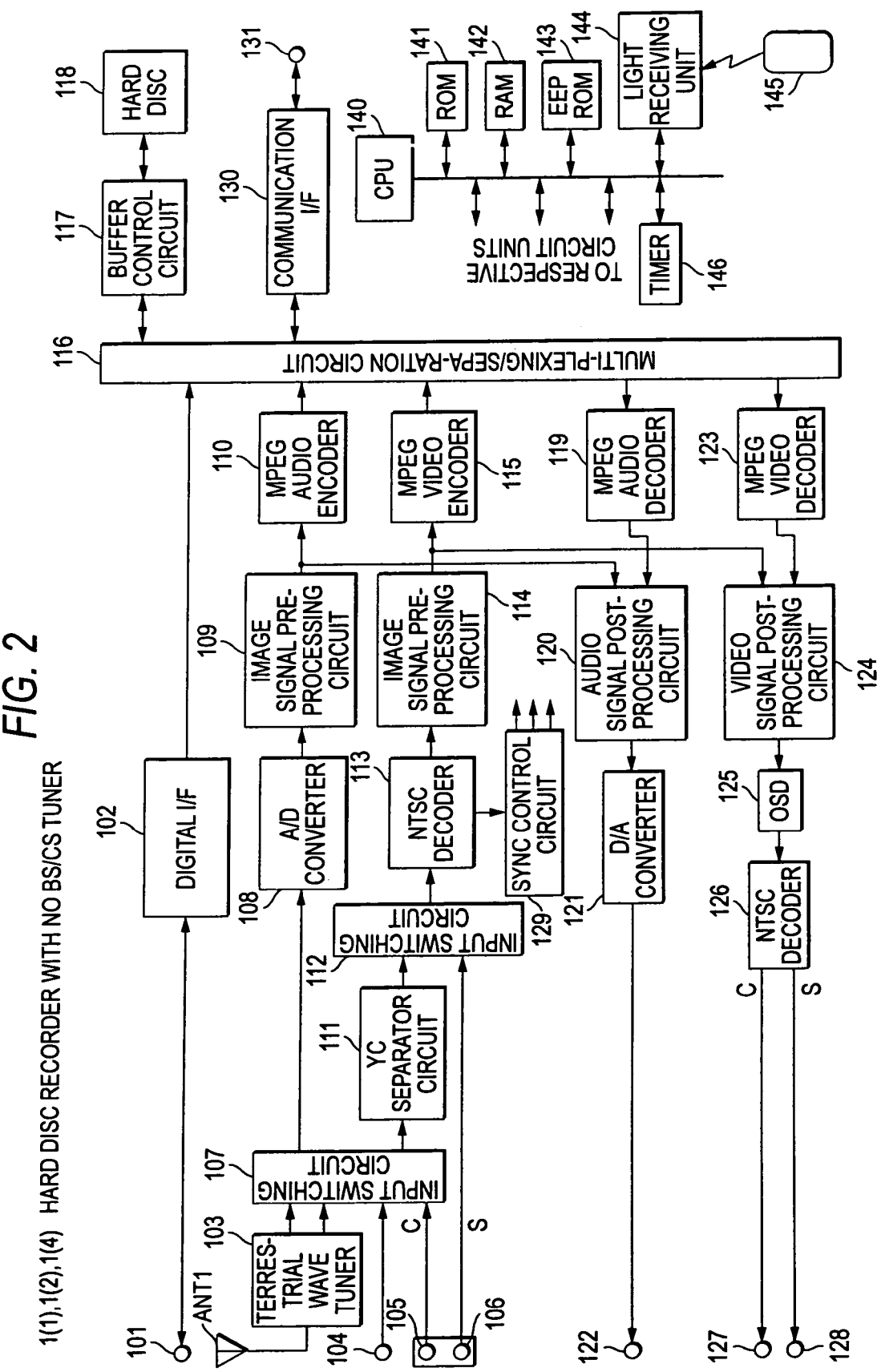
FIG. 2 is a block circuit diagram showing an example of a hard disc recorder, which is an embodiment of a recording device of the present invention.

First, a construction and operation of the hard disc recorders 1(1), 1(2) and 1(4), which have no BS/CS tuner, will be described. FIG. 2 is a block circuit diagram of the hard disc recorder 1(1), 1(2) and 1(4).

In FIG. 2, a CPU (Central Processing Unit) 140 controls a whole hard disc recorder by accessing a ROM (Read Only Memory) 141, a RAM (Random Access Memory) 142 and an EEPROM (Electrically Erasable and Programmable ROM) 143 through a host bus on demand.

As shown in FIG. 2, a light receiving portion 144 for receiving an infrared remote control signal is connected to the host bus. The light receiving portion 144 converts the infrared remote control signal from a remote commander 145 into an electric signal and supplies the electric signal to the CPU 140.

In response to the electric signal, the CPU 140 controls the respective portions to perform a processing corresponding to an instruction of a user through the remote commander 145 and/or perform various settings with respect to, for example, the EEPROM 143. Further, a timer 146 is connected to the host bus to provide present date, preset day of the week and present time.

Incidentally, the ROM 141 stores various data, which are necessary to perform various programs and processing to be executed in the hard disc recorder of this embodiment and the RAM 142 is mainly used as a working area for, for example, temporarily recording intermediate result of processing. Further, the EEPROM 143 is the so-called non-volatile memory, for keeping data such as various setting data stored even when a power source is shut down.

The hard disc recorder of this embodiment shown in FIG. 2 includes a digital input/output terminal 101 based on, for example, IEEE1394 standards as a digital input terminal portion and a terrestrial tuner 103, an analog audio input terminal 104 and analog video input terminals 105 and 106 as an analog input terminal portion.

The digital input/output terminal 101 is used as a digital output terminal portion and an analog audio output terminal 122 and analog video output terminals 127 and 128 are provided as an analog output terminal portion. Further, the hard disc recorder includes a communication terminal 131 through which various data can be exchanged through a communication network such as, for example, an internet.

The hard disc recorder shown in FIG. 2 can store a digital video signal and digital audio signal, which are received through the digital input terminal portion, in the hard disc 118 and output them through the digital output terminal portion, and, further, output it after converting it to an analog signal.

Further, the hard disc recorder shown in FIG. 2 can output an analog audio signal and an analog video signal, which are received through the above mentioned analog input terminal portion, through the analog output terminal portion, store it in the hard disc 118 by converting it into a digital signal and output it through the digital output terminal portion.

Data received through the communication terminal 131 and a communication interface 130 can be stored in the hard disc 118 and output as digital data and, when the received data is video data and/or audio data, it can be converted into an analog signal and output through the analog output terminal portion.

Utilization of Digital Input

A basic operation of the hard disc recorder 1(1), 1(2) or 1(4) of this embodiment when information is supplied through one of the above mentioned input terminal portions will be described.

First, an operation when a digital signal supplied from an external device through the digital interface is received through the digital input/output terminal 101 and recorded in the recording medium 118 or output by generating analog video and audio signals, will be described.

The digital signal supplied through the digital input/output terminal 101 is supplied to the digital interface circuit 102. The digital interface circuit 102 generates a TS (Transport Stream) signal by performing a processing such as format transformation, etc., to make a format of the digital signal adaptable to a method used in an image processing device of this embodiment and supplies the TS signal to a multiplex/separation circuit 116.

Further, the multiplex/separation circuit 116 can perform an analysis and generation of control signals, etc., to generate the TS signal having format recordable in the hard disc 118 and record the TS signal in the hard disc 118 through a buffer control circuit 117. Further, the multiplex/separation circuit 116 can generate an analog video signal and an analog audio signal by generating a video ES and an audio ES from the TS signal supplied from the digital interface circuit 102 and supplying the video ES and the audio ES to an MPEG video decoder 123 and an MPEG audio decoder 119, respectively, and outputs the analog video signal and the analog audio signal.

The MPEG audio decoder 119 decodes the audio ES supplied thereto to obtain an audio data in baseband and supplies the audio data to a post audio signal processing circuit 120. The MPEG video decoder 123 decodes the video ES supplied thereto to obtain a video data in baseband and supplies the video data to a post video signal processing circuit 124.

The post video signal processing circuit 124 performs a switching between the video data from the MPEG video decoder 123 and a video data from a pre video signal processing circuit 114 to be described later, an image composition and a filtering processing, etc., and supplies a resulting video data to an OSD (On Screen Display) circuit 125.

The OSD circuit 125 generates graphics and character data for display on a screen, performs processing such as overlapping the thus generated graphics and character data on the video data supplied to the OSD circuit 125 and partially displaying the graphics, the character data and the video data and supplies the thus processed video data to an NTSC encoder 126.

The NTSC encoder 126 produces an analog composite video signal C and a separate video signal S by converting the input video data (component digital signal) into a YC signal and then D/A-converting the YC signal and outputs them through the analog video output terminals 127 and 128, respectively.

Besides, the post audio signal processing circuit 120 performs a switching between audio data from the MPEG audio decoder 119 and an audio data from the pre audio signal processing circuit 109, a filtering processing, a fading processing and a speech speed conversion processing, etc., and supplies the processed audio data to an audio D/A converter 121. The audio D/A converter circuit 121 converts the supplied audio data into an analog audio signal and outputs the analog audio signal through an analog audio signal output terminal 122.

Incidentally, a television receiver (monitor receiver), for example, is connected to output sides of the analog audio output terminal 122 and the analog video output terminal 127, so that sound corresponding to the analog audio signal output through the analog audio output terminal 122 is generated by a loud speaker of the television receiver and a video image corresponding to the analog video signal output through the analog video terminal 127 is displayed on a display screen of the television receiver.

As described, in the hard disc recorder 1(1), 1(2) or 1(4), the video data and the audio data, which are obtained through the digital input/output terminal 101 and the digital interface circuit 102, are extracted and stored in the hard disc 118 and, simultaneously, the analog video signal and the analog audio signal are formed so that these analog signals can be output. That is, the program can be enjoyed while the video data and the audio data, which are supplied through the digital interface circuit 102, are being recorded in the hard disc 118.

Further, as described above, the TS signal newly formed in the multiplex/separation circuit 116 can be supplied to external devices such as hard disc recorders in other rooms through the digital interface circuit 102 and the digital input/output terminal 101 or the communication interface 130 and the communication terminal 131. In this case, the digital signal supplied to the digital interface circuit 102 is converted into a digital signal having a format adaptable to an external device and the digital signal is output.

Utilization of Analog Input

Next, an operation of the hard disc recorder in a case where an input of the analog signal is received through the terrestrial tuner 103, the analog audio input terminal 104 and the analog video input terminals 105 and 106, stored in the hard disc 118 and/or analog output, will be described.

The terrestrial tuner 103 receives and selects a terrestrial analog broadcast signal received through a receiving antenna ANT1 to modulate and obtains the analog video signal (composite signal) and the analog audio signal to supply to the input switching circuit 107. Similarly, the composite video signal C externally supplied through the analog video input terminal 105 and the audio signal supplied through the analog audio input terminal 104 are also supplied to the input switching circuit 107.

The input switching circuit 107 selects an aimed signal and outputs the aimed signal according to the control signal from the CPU 140. That is, the input switching circuit 107 is to switch either the analog video and audio signals from the terrestrial tuner 103 or the analog audio and video signals from the analog audio input terminal 104 and the analog video input terminal 106.

The analog audio signal among the signals output by the input switching circuit 107 is supplied to the A/D converter circuit 108 and the analog video signal (composite signal) is supplied to a YC separator circuit 111. The YC separator circuit 111 separates the supplied analog video signal to YC, that is, a luminance signal Y and a color difference signal C and supplies the luminance signal Y and the color difference signal C to the input switching circuit 112. A separate video signal S externally supplied through the analog video input terminal 106 is also supplied to the input switching circuit 112.

According to an instruction from the CPU 140, the input switching circuit 112 selects one of the externally supplied separate video signal S and the video signal from the YC separator circuit 111 and supplies the selected video signal to a NTSC (National Television System Committee) decoder circuit 113.

The NTSC decoder circuit 113 produces a digital component video data (video data) by converting the input analog video signal into a digital signal and performing a chroma decode processing, etc., and supplies the video data to the pre video signal processing circuit 114. Further, the NTSC decoder circuit 113 supplies a clock generated on the basis of a horizontal sync signal of the input video signal, the horizontal sync signal, a vertical sync signal and a field discrimination signal, which are obtained by sync separation, to the sync control circuit 129.

The sync control circuit 129 generates clock signals and sync signals providing timings necessary in respective circuit blocks on the basis of the respective signals supplied thereto and supplies the thus generated signals to the circuit blocks.

The pre video signal processing circuit 114 performs various video signal processing such as pre-filtering, etc., for the input video data and supplies a result of the processing to the MPEG video encoder 115 and the post video signal processing circuit 124.

The MPEG video encoder 115 performs coding processing such as block DCT (Discrete Cosine Transform), etc., for the video data from the video signal pre-processing circuit 114 to generate video ES and supplies the video ES to the multiplex/separation circuit 116.

On the other hand, the audio signal selected by the input switching circuit 107 is A/D converted by the A/D converter 108 to produce a digital audio signal (audio data) and supplies the audio data to the pre audio signal processing circuit 109. The pre audio signal processing circuit 109 filters the audio data and supplies the filtered data to the MPEG audio encoder 110.

The MPEG audio encoder 110 generates the audio ES after compression of the supplied audio data according to the MPEG format and supplies the audio ES to the multiplex/separation circuit 116 as in the case of the video data.

During the recording state, the multiplex/separation circuit 116 multiplexes the video ES from the MPEG video encoder 115, the audio ES from the MPEG audio encoder 110 and various control signals. That is, the multiplex/separation circuit 116 in the recording state generates, for example, the TS signal of the MPEG system by multiplexing the video ES, the audio ES and the various control signals. The TS signal thus generated is recorded in the recording medium 118 through the buffer control circuit 117.

As shown in FIG. 2, the audio data from the audio signal pre-processing circuit 109 is supplied to the MPEG audio encoder 110 and the post audio signal processing circuit 120 and the video data from the pre video signal processing circuit 114 is supplied to the MPEG video encoder 115 and the post video signal processing circuit 124.

The analog audio signal is produced by the functions of the post audio signal processing circuit 120 and the D/A converter 121 and the analog video signal is produced by the functions of the post video signal processing circuit 124, the OSD circuit 125 and the NTSC encoder 126.

That is, in parallel to the processing for converting the analog signal supplied through the terrestrial tuner 103, the analog audio input terminal 104, the analog video input terminals 105 and 106 into the digital signal and recording it in the recording medium 118, the video data and the audio data, which are to be recorded, can be reproduced and output.

Of course, it is possible to supply the signal, which is supplied through the terrestrial tuner 103, the analog audio input terminal 104 and the analog video input terminals 105 and 106 and converted into the digital signal, to the hard disc recorder or the TV set in another room through the digital interface circuit 102 and the digital input/output terminal 101 or the communication interface 130 and the communication terminal 131 or to the external device through the router 4.

Reproduction From Hard Disc 118

Next, an operation of the hard disc recorder of this embodiment in a case where the video signal and the audio signal recorded in the hard disc 118 in the described manner are reproduced will be described. Under control of the CPU 140, the TS signal to be reproduced is read out from the recording medium 118 and supplied to the multiplex/separation circuit 116 through a buffer control circuit 117.

In reproducing, the multiplex/separation circuit 116 separates the video ES and the audio ES from the TS signal read out from the recording medium 118, supplies the separated audio ES to the MPEG audio decoder 119 and the video ES to the MPEG video decoder 123.

The processing to be performed in the respective circuits following the MPEG audio decoder 119 and the processing to be performed in the respective circuits following to the MPEG video decoder 123 are as described in the case where the digital input is used. That is, the analog audio signal is generated from the audio ES supplied to the MPEG audio decoder 119 and the analog video signal is generated from the video ES supplied to the MPEG video decoder 123.

Therefore, an image and sound corresponding to the video data and the audio data read out from the hard disc 118 can be output through, for example, a TV set connected to the analog audio output terminal 122 and the analog video output terminal 127 and can be enjoyed on the display screen thereof.

It is, of course, possible to supply the digital video signal and the digital audio signal read out from the hard disc 118 to the hard disc recorder, etc., in another room through the digital interface circuit 102, the digital input/output terminal 101 or the communication interface 130 and the communication terminal 131.

Utilization of Communication Terminal and Communication Interface

Further, as described previously, the hard disc recorder of this embodiment includes the communication interface 130 and the communication terminal 131 and is connected to the network such as internet through, for example, a telephone circuit to acquire various data from or to send various data to the network.

As various data, which can be received and sent, there are video data, audio data, various programs and text data. In a case of the video data and the audio data, it is possible to store them in the recording medium 118 through the multiplex/separation circuit 116.

By using the multiplex/separation circuit 116, an audio signal reproducing system including the MPEG audio decoder 119, the post audio signal processing circuit 120, the D/A converter 121 and the audio output terminal 122 and a video signal reproducing system including the MPEG video decoder 123, the post video signal processing circuit 124, the OSD 125, the NTSC encoder 126 and the video output terminal 127, it is possible to reproduce the video data and the audio data acquired through the communication network.

Further, the video data and the audio data acquired through the communication interface 130 and the communication terminal 131 can be supplied to TV sets 4B to 4D, etc., in other rooms through the digital interface circuit 102 and the digital input/output terminal 101 or through the communication interface 130 and the communication terminal 131.

Further, it is possible to receive an offer of such as programs and/or control data, which are used in the hard disc recorder of this embodiment, through a network, store them in such as the EEPROM 143 and utilize them on demand.

For example, it may be possible to perform a grade-up of the hard disc recorder of this embodiment or to preliminarily prepare an electronic program guide table by preliminarily acquiring EPG data, etc.

Incidentally, in this embodiment, the video data and the audio data are compressed according to MPEG. However, a compression system other than MPEG may be used. Alternatively, it may be possible to process data without compression.

When one of the TV sets receives a control signal addressed to the one TV set through the digital input/output terminal 101 and the digital interface circuit 102, the control signal is supplied from the digital interface circuit 102 to the CPU 140. On the contrary, a signal such as request signal from the CPU 140 of the hard disc recorder of this embodiment can be transmitted to an aimed device through the digital interface circuit 102 and the digital input/output terminal 101.

Hard Disc Recorder with BS/CS Tuner

Figure 3:
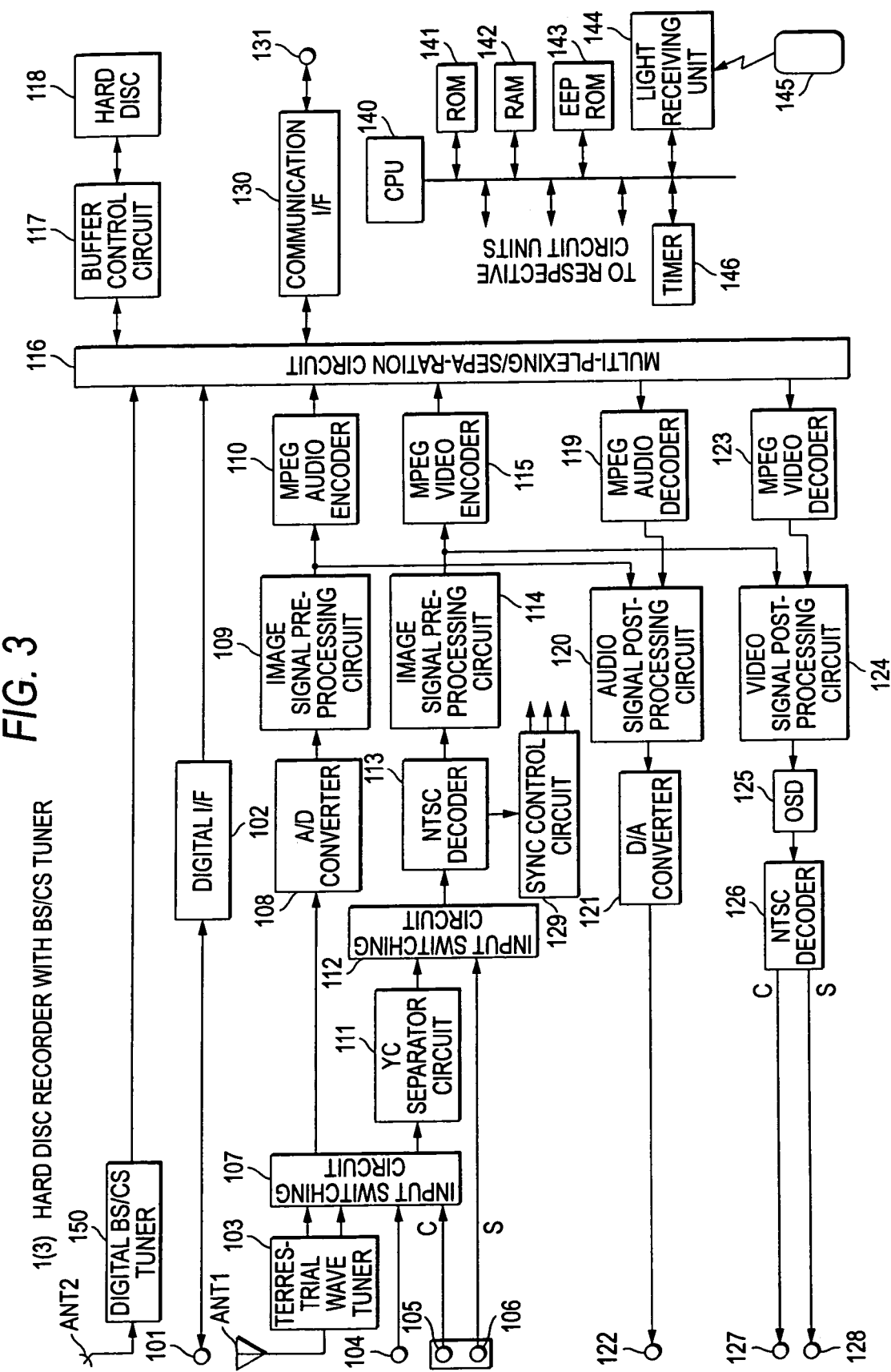
FIG. 3 is a block circuit diagram showing an example of a hard disc recorder, which is another embodiment of a recording device of the present invention.

Now, a construction and operation of a hard disc recorder 1(3) having a digital BS/CS tuner will be described. FIG. 3 is a block circuit diagram of the hard disc recorder 1(3). As will be clear from a comparison of FIG. 3 with FIG. 2, the construction of the hard disc recorder 1(3) is identical to that of the hard disc recorder 1(1), 1(2) or 1(4), expect that the hard disc recorder 1(3) has the digital BS/CS tuner 150 while the hard disc recorder shown in FIG. 2 has no BS/CS tuner. Therefore, constructive components of the hard disc recorder 1(3), which are similar to those of the hard disc recorder shown in FIG. 2, are depicted by the same reference numerals as those used in FIG. 2, respectively, and detailed description of these components is omitted.

The operation of the hard disc recorder 1(3) will be described, in a case where the hard disc recorder 1(3) receives a BS digital broadcast signal or a CS digital broadcast signal through the digital BS/CS tuner 150, records the signal in a hard disc 118 thereof and outputs an analog signal.

A parabolic antenna ANT2 is connected to the digital BS/CS tuner 150 for receiving digital broadcast signals from a satellite. The digital BS/CS tuner 150 receives and selects an aimed digital broadcast signal on the basis of a station select control signal corresponding to a user instruction for selecting a broadcast station, which is supplied from a CPU 140, and supplies the received and selected digital broadcast signal to a multiplex/separation circuit 116.

The digital broadcast signal in every channel as a program transmission path takes in the form of packets of image data (video data), audio data and various other data, which construct a broadcast program, and various control data such as station select information called PSI (Program Specific Information) and EPG (Electronic Program Guide) data for forming an electronic program guide and is transmitted by multiplexing these packets. That is, the digital broadcast signal has the so-called TS signal format.

An identifier (ID) is attached to each packet to make extraction of the PSI data and the EPG data or the image and audio packets possible by using the identifier.

The multiplex/separation circuit 116 makes the program selection possible by extracting the PSI data and the EPG data from the TS signal supplied from the digital BS/CS tuner 150 and supplying the extracted data to the CPU 140. Further, the multiplex/separation circuit 116 makes a program selection and a setting of video recording possible by forming the EPG electronic program guide table and displaying the table according to a user instruction.

Further, when a recording of the selected program is instructed by the user, the multiplex/separation circuit 116 extracts, from the TS signal supplied from the digital BS/CS tuner 150, a video packet and an audio packet of a program selected by the user to form a new TS signal constructed with these packets and required control data. The new TS signal is stored in a hard disc 118 through a buffer control circuit 117.

At the same time, the multiplex/separation circuit 116 produces the video ES from the video packet of the aimed program extracted from the TS signal supplied from the digital BS/CS tuner 150 and supplies the video ES to an MPEG video decoder 123. Further, the multiplex/separation circuit 116 produces the audio ES from the audio packet and supplies the audio ES to an MPEG audio decoder 119.

The processing in respective circuits following an MPEG audio decoder 119 and the processing in respective circuits following the MPEG video decoder 123 are as described in the case where the digital input is used. That is, an analog audio signal is produced from the audio ES supplied to the MPEG audio decoder 119 and an analog video signal is produced from the video ES supplied to the MPEG video decoder 123.

Therefore, it becomes possible to selectively receive the TV broadcast program through the digital BS/CS tuner 150 of the TV set connected to an analog audio output terminal 122 and an analog video output terminal 127 and, further, it is possible to enjoy the selected TV broadcast program by outputting an image and sound corresponding to the video data and the audio data of the selected broadcast program.

As described, in the hard disc recorder 1(3) of this embodiment, the video data and the audio data of the aimed program are extracted from the digital broadcast signal selectively received through the digital BS/CS tuner 150 and stored in the hard disc 118 and the analog video signal and the analog audio signal can be produced simultaneously. That is, it is possible to enjoy the aimed program supplied as the digital broadcast signal while storing the program in the hard disc 118.

Further, as described, it is possible to supply the new TS signal produced in the multiplex/separation circuit 116 to external devices such as hard disc recorders, other recording devices or personal computers located in other rooms through the digital interface circuit 102 and the digital input/output terminal 101 or through the communication interface 130 and the communication terminal 131. In such case, the digital interface circuit 102 may convert the format of the thus supplied digital signal into a format adaptable to the external device.

Reservation of Video Recording in Hard Disc Recorder

The reservation or recording of a TV broadcast program in the hard disc recorders 1(1), 1(2), 1(3) and 1(4) shown in FIG. 2 and FIG. 3 are performed similarly. Therefore, any of the hard disc recorders 1(1), 1(2), 1(3) and 1(4) will be described as a general hard disc recorder, except special case.

When a user intends to perform a reservation of video recording by the hard disc recorder of this embodiment, the user performs a predetermined operation through a remote commander 145. That is, the user can perform the reservation of video recording by merely displaying the EPG on the display screen of the TV receiver connected to the hard disc recorder and selecting an aimed program through the displayed EPG.

In this case, the aimed broadcast program can be selected by moving a cursor on the displayed EPG by operating a cursor shift key such as arrow keys of the remote commander 145. A display of the cursor is communally performed by the CPU 140 and the OSD circuit 125, etc.

The reservation of video recording, which is performed through the EPG as mentioned above, is stored in a predetermined region of the EEPROM 143 or the hard disc 118, so that it is possible to confirm the state of reservation or to change or delete the reservation by displaying it on the screen of the TV set.

In the case where the reservation of video recording is performed by using the EPG, however, the EPG includes program information of BS and CS broadcast programs, pay programs and local broadcast programs. Therefore, there may be a case where a reservation of video recording of BS broadcast program or a local broadcast program, which can not be received by the hard disc recorder, is made in the hard disc recorder 1(1) or 1(2) having no BS/CS tuner, resulting in that the reservation of video recording of broadcast program can not be done.

In view of this, according to the recording system of the present invention, when a reservation of video recording for a broadcast program provided by a broadcast signal, which can not be selectively received by a first hard disc recorder, is performed in the first hard disc recorder, the reservation made by the first hard disc recorder is transferred to a second hard disc recorder capable of selectively receiving the same broadcast signal so that the reservation of video recording of the aimed broadcast program is vicariously performed in the second hard disc recorder.

Figure 4:
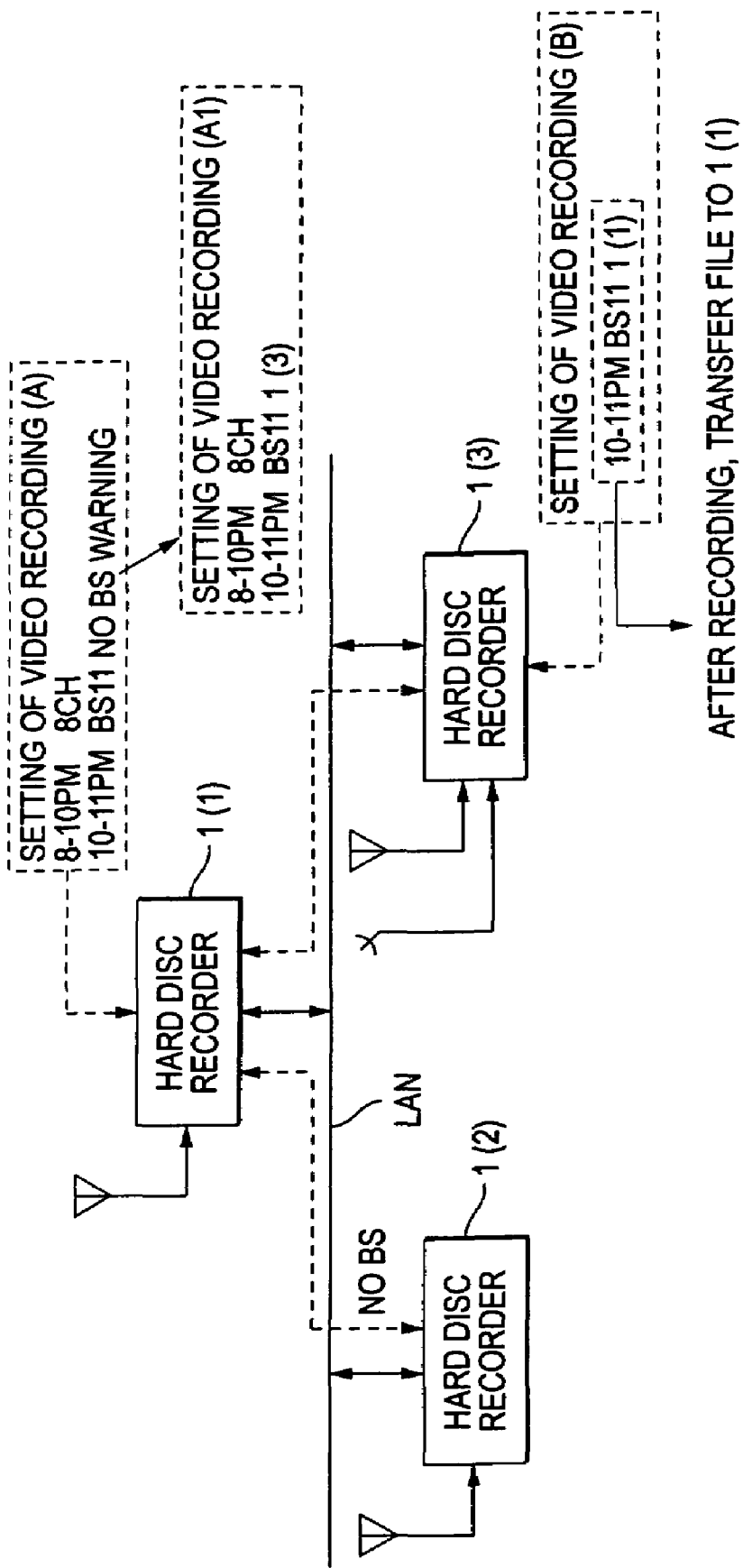
FIG. 4 is a block diagram showing a processing of recording reservation of a broadcast program in the home network shown in FIG. 1.

FIG. 4 shows a processing for reservation of video recording of a broadcast program, which is performed in the home network system of this embodiment. Incidentally, the reservation is usually made for a broadcast program of, for example, tomorrow, 3 days after or one week after, etc. In order to simplify the description, the processing for reservation of video recording to be made for a program of today will be described.

As shown by a reservation of video recording (A) for the hard disc recorder 1(1) in FIG. 4, it is assumed that a reservation for a broadcast program in broadcasting channel 8 (8ch) from 8 PM to 10 PM is performed and then a reservation for a program in BS channel 11 from 10 PM to 11 PM is performed. In such case, since the hard disc recorder 1(1) has no BS/CS tuner as mentioned previously, a warning message saying impossibility of the reservation for any program of the BS broadcast is output.

The checking of the impossibility of reservation can be relatively easily and correctly discriminated by comparing, in the CPU 140 of the hard disc recorder 1(1), information of the presently input reservation with performance information of the hard disc recorder. When the reservation for the broadcast program of the broadcasting signal, which can not be electively received, is performed, the CPU 140 of the hard disc recorder 1(1) immediately inquires of the other hard disc recorders 1(2) and 1(3) through the LAN whether or not the second reservation according to the second setting information (broadcast channel BS11 from 10 PM to 11 PM) is possible.

Since, in the case shown in FIG. 4, the hard disc recorder 1(2) has no BS/CS tuner, it sends a notice of impossibility of the second reservation to the hard disc recorder 1(1). In this case, the hard disc recorder 1(1) passes the hard disc recorder 1(2), which sends the impossibility notice, and then inquires of the hard disc recorder 1(3).

The hard disc recorder 1(3) has the BS/CS tuner 150 as shown in FIG. 3 and can accept the reservation from the hard disc recorder 1(1) so long as the hard disc recorder 1(3) has no reservation for BS broadcast in the same time period. In this case, it is assumed that the hard disc recorder 1(3) has no reservation for BS broadcast in the same time period.

The hard disc recorder 1(3) notifies the hard disc recorder 1(1) of possibility of receiving of the second reservation from the hard disc recorder 1(1) and accepts the reservation from the hard disc recorder 1(1) as shown by a reservation (B) for the hard disc recorder 1(3), in FIG. 4. Thus, instead of the hard disc recorder 1(1), the hard disc recorder 1(3) records the TV broadcast program in BS11 channel from 10 PM to 11 PM.

Since, the reservation from the hard disc recorder 1(1), which is accepted by the hard disc recorder 1(3), is made by the hard disc recorder 1(1), information indicating that it is received from another recorder and information (in this case, a reference numeral "1(1)") indicating that the another recorder is the hard disc recorder 1(1) are attached to the reservation as shown in the reservation (B) in FIG. 4, in order to make clear the fact that the original reservation is sent from the hard disc recorder 1(1).

The reservation of video recording of the broadcast program in the broadcast channel BS11 in the time period from 10 PM to 11 PM is received as it is by the hard disc recorder 1(1). However, in order to notify a user of the vicarious reservation of the TV broadcast program in the BS channel 11 from 10 PM to 11 PM executed by the hard disc recorder 1(3), the reservation information of the TV broadcast program in the BS channel 11 from 10 PM to 11 PM is attached with information showing a forwarding recorder (a reference numeral "1(3)" in this example) as shown by the reservation (A1) of the hard disc recorder 1(1) in FIG. 4.

On the basis of the reservation information (BS11, 10 PM-11 PM) from the hard disc recorder 1(1), the hard disc recorder 1(3) starts the video recording of the program broadcasted through the BS channel 11 at 10 PM set in the reservation.

When the video recording in the hard disc recorder 1(3) based on this reservation information is ended at 11 PM, the hard disc recorder 1(3) performs a move processing including production of a file of the recorded program information (video data and audio data, etc., constituting the program), transfer of the file to the hard disc recorder 1(1) through the LAN and, after the transfer, erase of its own file. Since there is no copy produced in the move processing, it is effective in view of copy right protection. For contents, which do not require such protective operation, it is possible to perform only the transfer (copy) thereof.

Incidentally, though the hard disc recorder 1(1) is described as the original program setting recorder, which receives the reservation of program recording from the user, the hard disc recorder 1(2) is operated similarly to the hard disc recorder 1(1).

In the following description, a hard disc recorder, which directly receives a reservation of video recording from a user and requests a vicarious reservation, may be called as a requesting hard disc recorder and a hard disc recorder, which vicariously executes a reservation of program recording according to a reservation information from the requesting hard disc recorder, may be called as a requested hard disc recorder.

Processing Performed in Hard Disc Recorder

Now, various processing related to reservation of video recording performed in the hard disc recorders 1(1), 1(2) and 1(3) in the home network system of this embodiment will be described with reference to flowcharts. Incidentally, in the following description, each of the hard disc recorders 1(1), 1(2) and 1(3) will be referred to as merely a hard disc recorder.

Reception Processing of Reservation of Video Recording

Figure 5:
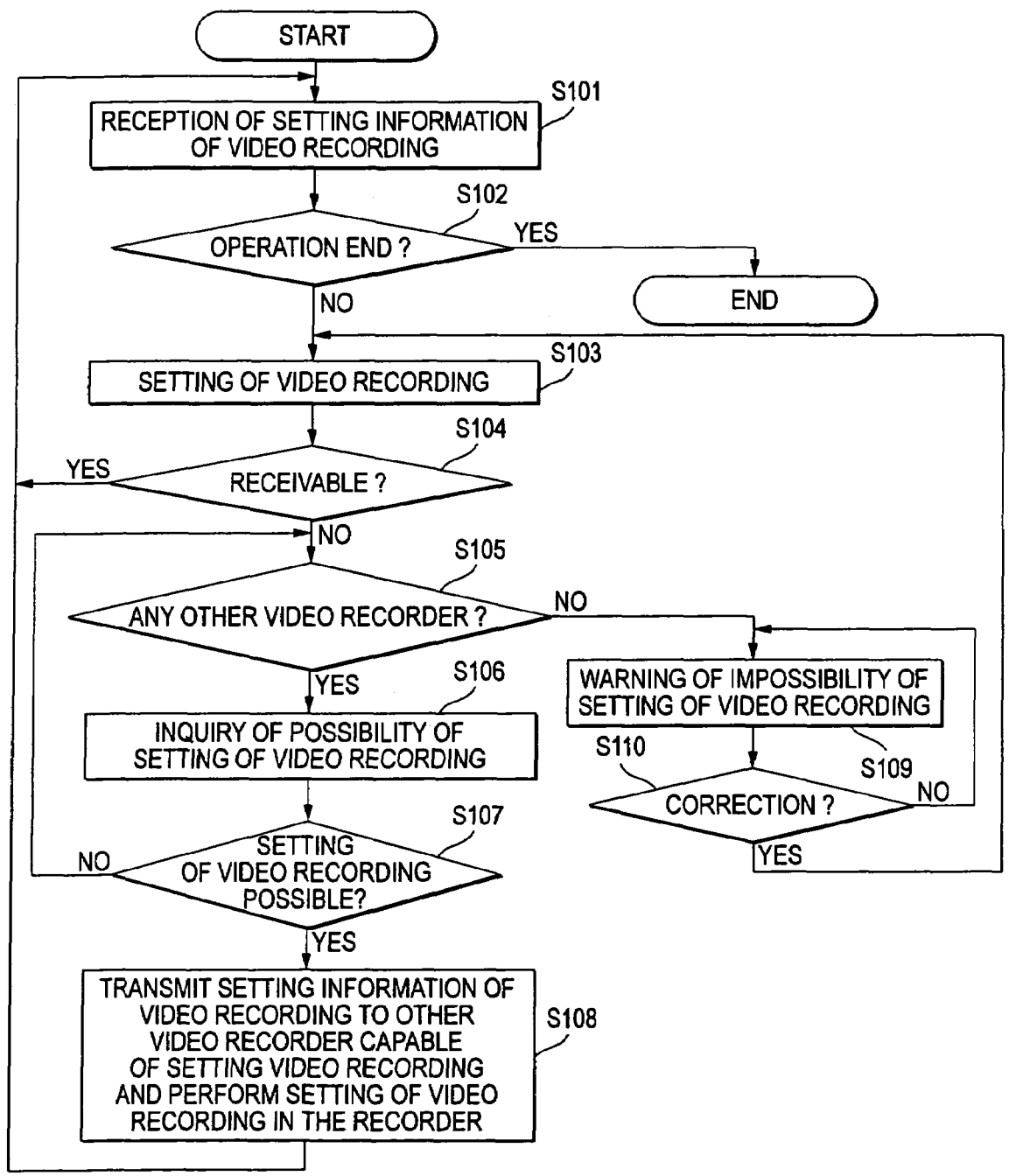
FIG. 5 is a flowchart of the video recording reservation processing.

First, the reception processing of reservation of video recording to be performed in the hard disc recorder will be described. FIG. 5 is a flowchart of the reception processing to be performed in the hard disc recorder of this embodiment. The processing shown in FIG. 5 is executed by, for example, selecting a reservation of video recording from a function selection menu.

When the processing shown in FIG. 5 is executed, the CPU 140 of the hard disc recorder displays EPG corresponding to EPG data stored in the EEPROM 143 of the same hard disc recorder on a display screen of a TV set connected to the same hard disc recorder and receives a selection input of TV broadcast program to be recorded (step S101). That is, the processing in the step S101 is to receive the reservation information from a user. Incidentally, the display of EPG is executed under control of the CPU 140 through the OSD circuit 125 with using the EPG data in the EEPROM.

Next to the step S101, it is decided whether or not an ending operation of the processing of reservation is received (step 102). When it is decided in the step S102 that the ending operation is accepted, the processing shown in FIG. 5 is ended. On the other hand, when it is decided in the step S102 that the ending operation is not accepted, a reservation information corresponding to the selective input of the accepted broadcast program is set (step S103).

Thereafter, the CPU 140 decides whether or not the broadcast program corresponding to the reservation information, which is newly set in the step S103, can be selectively received (step S104). The processing in the step S104 is to determine whether or not the broadcast signal indicated by the reservation information can be selectively received by the function of the hard disc recorder. The determination in the step S104 is performed on the basis of information related to the own function, etc.

FIG. 6 shows an example of information related to the own function, etc., of the hard disc recorder of the embodiment, which is stored in, for example, the EEPROM 143 thereof. FIG. 6A shows a receiving function information showing a broadcast signal, which can be selectively received, and FIG. 6B shows a receivable station information showing stations broadcasting selectively receivable signals, that is, selectively receivable broadcasting channels.

The receiving function information shown in FIG. 6A indicates that only analog terrestrial TV broadcasting is receivable and there is no receiving function for digital terrestrial TV broadcasting, BS and CS broadcastings. Therefore, since the hard disc recorders 1(1), 1(2) and 1(4) can selectively receive only analog terrestrial TV broadcasting, it has the receiving function information shown in FIG. 6A.

Further, in the receivable station information shown in FIG. 6B, broadcast channels, which can be selectively received in Tokyo and suburbs thereof, are set as the receivable channels. In the case shown in FIG. 6B, generally used channel numbers in VHF band, which can be selectively received in Tokyo and the suburbs, are channel 1, channel 3, channel 4, channel 6, channel 8, channel 10 and channel 12 and receivable channels in UHF band are, for example, channel 43.

Therefore, it is determined in the step S104 whether or not the selective receiving of the broadcast program shown by the received reservation information on the basis of information related to the function information, etc., of the own hard disc recorder in FIG. 6A and FIG. 6B. That is, in the hard disc recorders 1(1) and 1(2), it is determined that the BS broadcast signal, the CS broadcast signal and the broadcast signals of local stations, which can not be selectively received by own hard disc recorder, are determined as not selectively receivable. Further, when broadcast channel other than the broadcast channels shown in FIG. 6B is instructed as to be received, the hard disc recorder decides the channel as not selectively receivable.

Incidentally, in the hard disc recorder of this embodiment, the receiving function information such as shown in FIG. 6A is preliminarily set in a manufacturing process of the same hard disc recorder. Further, in the receivable station information such as shown in FIG. 6B, it is possible to set broadcast channels, which can be selectively received, in a place of use by inputting the place of use at a start time of use and to perform change or deletion appropriately.

When a broadcast program corresponding to the reservation information is decided as selectively receivable in the decision processing in the step S104, the processing from the step S101 is repeated to repeat the reception of the reservation of video recording, under control of the CPU 140.

When a broadcast program corresponding to the reservation information is decided as not selectively receivable in the decision processing in the step S104, it is decided whether or not there is any hard disc recorder to which the reservation information can be transferred under control of the CPU 140 (step S105).

When it is decided in the step S104 that the broadcast program corresponding to the reservation information is not selectively receivable due to absence of the BS tuner, it is possible in the decision processing in the step S105 to send a response request on the LAN, recognize a hard disc recorder, which responds to the request, as a recording device connected to the LAN, hold information for identifying the recognized recording device and decide existence of another recording device on the basis of the information.

Incidentally, it may be possible, in such case, to send the response request to the LAN and recognize a hard disc recorder, which responds thereto, as a recording device connected to the LAN or to register once recognized hard disc recorder in, for example, the EEPROM 143 of each hard disc recorder and then decide a presence of a recording device on the LAN on the basis of the information in the EEPROM 143.

In the case where the broadcast program corresponding to the reservation information can not be selectively received by a hard disc recorder due to that it is broadcasted by a local station, it may be possible to decide the presence of another recording device, which can selectively receive the broadcast signal of the same local station, by deciding whether or not there are recording devices, which are preliminarily registered in a memory such as EEPROM 143 of such hard disc recorder and can selectively receive the broadcast signal from the local station, in the step S105.

FIG. 7 shows a list of hard disc recorders, which are owned by local relatives and/or friends and are in cooperative relation to each other to allow mutual transfer of reservation of video recording, that is, cooperative hard disc recorder on a wide area network. As shown in FIG. 7, each of the hard disc recorders 1(1), 1(2) and 1(3) can register recording devices such as hard disc recorders, which are connected to the wide area network in cooperative relation to each of the hard disc recorders 1(1) 1(2) and 1(3) and are mutually communicable.

The list of the recording devices such as cooperative hard disc recorders is constructed with identification ID's for identifying the cooperative recording devices, address information showing locations of the cooperative recording devices, information (receivable station information) showing broadcast channels, which can be received by the cooperative recording devices, owner information such as telephone numbers of the owners of the cooperative recording devices for connecting communication lines (telephone lines) to the cooperative recording devices, etc., as shown in FIG. 7.

As described above, when the received reservation information indicates a broadcast channel of a local station and the channel can not be selectively received by the hard disc recorder, presence or absence of recording devices, which are in cooperative relation to the hard disc recorder and can selectively receive the broadcast signal of the aimed broadcast channel, that is, other recording devices to which the reservation information can be transferred, is decided from the list of the cooperative hard disc recorders on the wide area network, which is stored in the EEPROM 143 and shown in FIG. 7. Incidentally, in this embodiment, the recording device on the wide area network and in cooperative relation to the hard disc recorders 1(1), 1(2) and 1(3) is the hard disc recorder 1(4).

When it is decided in the step S105 that other recording devices to which the program setting information can be transferred are present, an inquiry as to whether or not they can receive the broadcast signal corresponding to the received reservation information and as to whether or not a reception of the reservation information is possible is sent to one of these recording devices (step S106). Then, response information from the recording devices are confirmed to decide possibility of the reservation of video recording (step S107).

Incidentally, in the processing in step S106, the inquiry for hard disc recorders on the LAN is sent through the LAN and the inquiry for recording devices on a wide area network 5 and in cooperative relation is sent through the LAN and the wide area network 5. Therefore, when the inquiry is made to the recording devices on the wide area network, a connection processing of the communication line and, according to circumstances, a cutting processing of the communication line thus connected are performed.

In the decision processing in step S107, when the response information from the recording devices indicate impossibility of reservation, the processing is repeated from the step S105 to decide the presence of other recording devices on the LAN and, when there are other recording devices, an inquiry for possibility of reservation is sent to the same recording devices.

Then, when it is decided in the step S107 that the reference recording device (hard disc recorder) sends a response of possibility of reservation corresponding to the newly received reservation information, which is received in the step S101, the reservation information is transmitted to the hard disc recorder, which is the reference recording device capable of performing the reservation of video recording, and the reservation of video recording is performed in the recording device under control of the CPU 140 (step S108). Thereafter, the processing is repeated from the step S101 to repeatedly receive reservation information.

Incidentally, when it is decided in the decision processing in the step S105 that there is no other recording devices capable of accepting reservation received on the LAN in the step S101, a warning of impossibility of recording corresponding to reservation of video recording received in the step S101 is given to the user (step S109). Then, it is decided whether or not a correction of the reservation information is received (step S110).

When it is decided in the decision processing in the step S110 that the correction of reservation information is not received, the processing is repeated from the step S109. Thereafter, when it is decided that the correction of reservation information is received, it is confirmed, by repeating the processing from the step S103, whether or not an overlapping of time zones occurs.

As described, when each of the hard disc recorders 1(1), 1(2) and 1(3), which are the recording devices constructing the home network system of this embodiment, can not receive the broadcast program provided by the broadcast signal by itself, the reservation of video recording can be performed by one of other hard disc recorders existing on the same LAN, which can selectively receive the broadcast signal indicated by the reservation information.

Incidentally, as described above, when the hard disc recorder can not record a program of a broadcast signal because the signal is broadcasted by a local station, the hard disc recorder can transfer the reservation information to the aimed recording device such as the hard disc recorder 1(4) through the hub 3, the router 4 and the wide area network 5 by connecting the communication line between the hard disc recorder and the hard disc recorder 1(4).

Reception Processing of Information Addressed to Own Recorder

Figure 8:
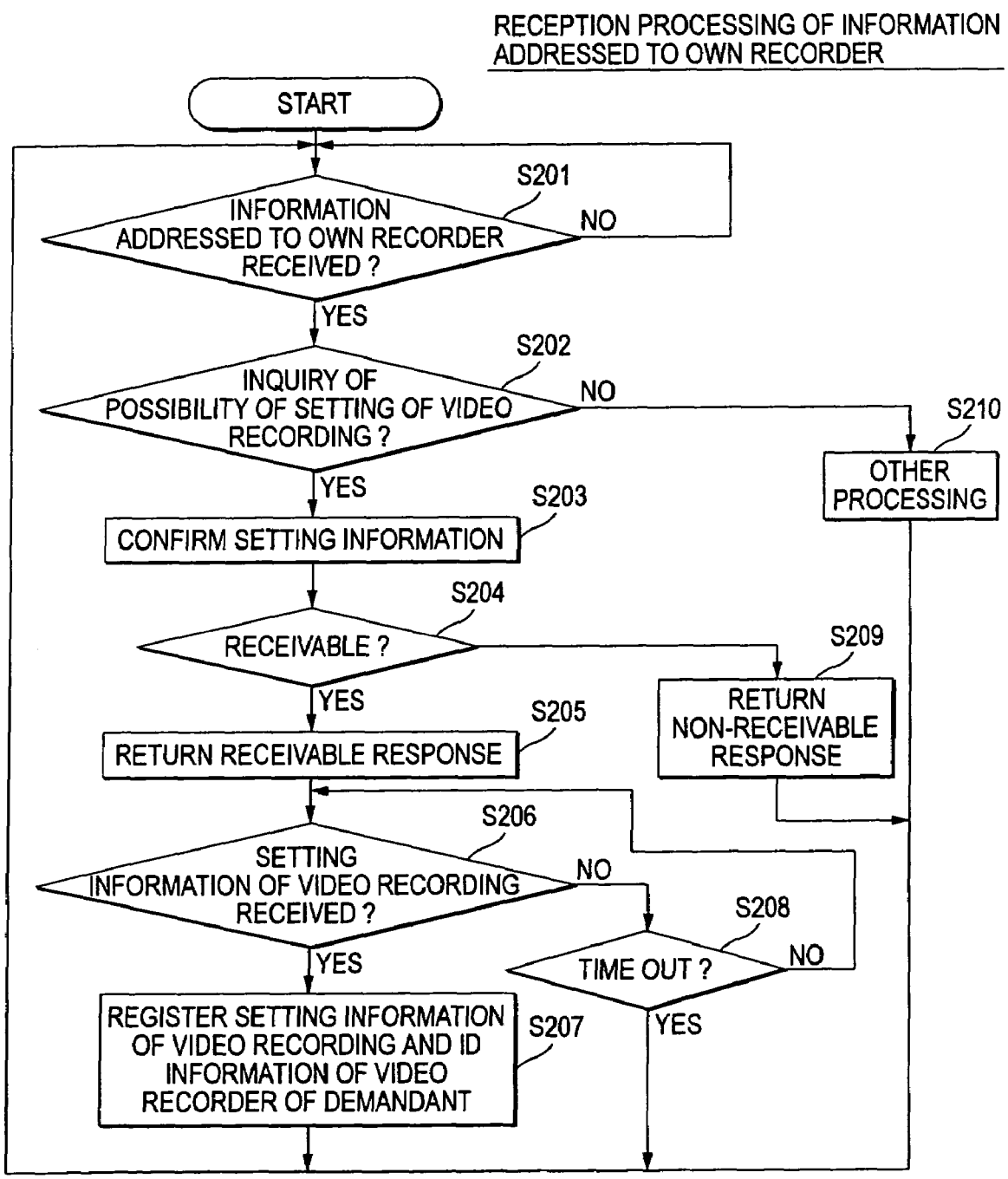
FIG. 8 is a flowchart of a reception processing of information addressed to own recording device.

Now, a reception processing of information such as reservation information transmitted to a hard disc recorder, which is one of the hard disc recorders 1(1), 1(2), 1(3) and 1(4), through LAN or a wide area network such as telephone network or internet will be described. FIG. 8 is a flowchart showing the reception processing of information addressed to the hard disc recorder 1. The processing shown in FIG. 8 is executed in each of the hard disc recorders when the information can be received by them through LAN or the wide area network.

When the processing shown in FIG. 8 is executed, the hard disc recorder of this embodiment waits for information addressed thereto and transmitted through LAN or wide area network under control of the CPU 140 thereof (step S201). When it is decided in this step S201 that information addressed to the hard disc recorder is received, a decision is made on whether or not the received information inquires about possibility of reservation of video recording (step S202).

When it is decided in the decision processing in the step S202 that the information received by itself is an inquiry about possibility of the reservation of video recording, information related to functions of the hard disc recorder, which are stored in the EEPROM 143 thereof and shown in FIG. 6, and already registered reservation information are confirmed (step S203). And then, possibility of reception of reservation of video recording from another recorder is decided on the basis of the inquiry information of possibility of reservation, which is received, the information related to the functions thereof and the reservation information, which are stored in the EEPROM 143 (step S204).

When it is decided in the decision processing in the step S204 that the reception of the reservation of video recording is possible, a reception affirmative response is produced and is sent to the inquiring hard disc recorder through the digital interface circuit 102 and the digital input/output terminal 102 or through the communication interface 130 and the communication terminal 131 under control of the CPU 140 thereof (step S205).

Then, the CPU 140 thereof waits for reservation information transmitted from the requesting hard disc recorder inquiring possibility of reservation of video recording (step S206). When it is decided in the decision processing in the step S206 that the reservation information is received, the CPU 140 of the requesting hard disc recorder registers the reservation information and the identification information of the requesting hard disc recorder (step S207) and then the processing is repeated from the step S201.

When it is decided in the step S206 that the reservation information is not received yet, it is decided whether or not a predetermined time is elapsed from the affirmative response (step S208). When the predetermined time is not elapsed, the processing from the step S206 is repeated. When the predetermined time is elapsed, the processing from the step S201 is repeated.

When, in the decision processing in the step S204, it is decided, on the basis of the information related to the function of the requested hard disc recorder and the reservation information already registered, that reception of reservation is impossible, a negative response is produced and sent to the requesting hard disc recorder under control of the CPU 140 (step S209). Thereafter, the processing from the step S201 is repeated.

In the step S202, when the information addressed to the requested recorder is not related to an inquiry of possibility of reservation, other processing corresponding to the received information is performed under control of the CPU 140 thereof (step S210) and, thereafter, the processing from the step S201 is repeated. Incidentally, a typical example of the processing performed under control of the CPU 140 in the step S210 is to read out the requested contents from the hard disc 118 thereof and send it to the requesting hard disc recorder through the digital interface circuit 102, the digital input/output terminal 101 and the LAN or through the communication interface 130, the communication terminal 131 and the wide area network 5 under control of the CPU 140 thereof, when the information addressed to the requested recorder is a request of providing contents.

As described, the hard disc recorder of this embodiment receives the information addressed thereto through the LAN or the wide area network and executes processing corresponding to the received information. When the hard disc recorder can accept the reservation of video recording from another recorder, the hard disc recorder accepts the reservation from the other recorder and performs the recording vicariously.

Processing of Hard Disc Recorder Receiving Program Reservation from Other Recorder Now, a recording processing performed by a hard disc recorder of this embodiment on the basis of the reservation of video recording in a case where a reservation information from another recorder is accepted through the processing shown in FIG. 8 or a reservation information directly input by a user through processing shown in FIG. 5 will be described.

Figure 9:
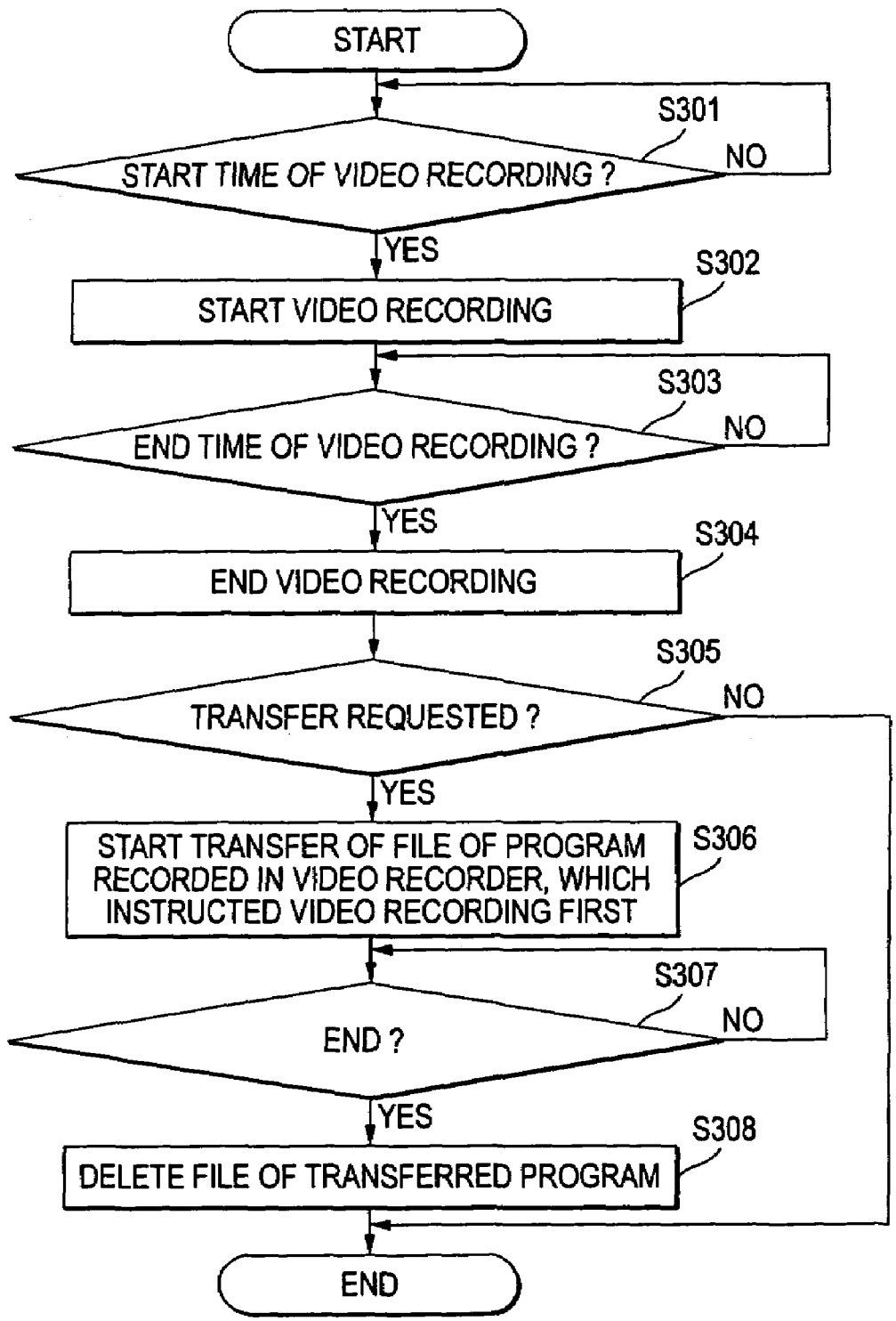
FIG. 9 is a flowchart of a recording processing based on reservation of video recording.

FIG. 9 is a flowchart showing the recording processing based on a reservation of video recording executed by the hard disc recorder according to this embodiment. The processing shown in FIG. 9 is for a case where a reproducing processing is not performed in the recorder, which is requested to perform the reservation of video recording and is still in a waiting state for a video recording processing.

The CPU 140 of the hard disc recorder, which is in the waiting state for video recording processing, decides whether or not it becomes a time instance at which the video recording of a TV broadcast program is started, by comparing a video recording start time of the reservation information stored in the EEPROM 143 thereof with a current time provided by a timer 146 (step S301).

In the processing in the step S301, when it is before the video recording start time, the hard disc recorder is in the waiting state until it becomes the video recording start time and the processing in step S301 is repeated. When it becomes the video recording start time, the CPU 140 of the recorder controls various portions thereof according to the reservation information and starts the video recording of the TV program set (step S302).

Then, the CPU 140 decides whether or not it becomes a video recording end time of the reservation information by comparing the video recording end time stored in the EEPROM 143 thereof with a current time provided by the timer 146 (step S303)

When it is decided in the processing in step S303 that it is still before the video recording end time, the processing in step S303 is repeated while continuing the video recording processing and the hard disc recorder becomes in the waiting state until it becomes the video recording end time. When, in the processing in step S303, it is decided that it becomes the video recording end time of the broadcast program, the CPU 140 controls the various portions of the hard disc recorder to end the video recording of the TV broadcast program (step S304).

Then, the CPU 140 decides whether or not the TV broadcast program recorded is contents to be transferred (step S305). In concrete, the CPU 140 decides whether the contents is recorded correspondingly to the reservation request from other recorder or is recorded correspondingly to the reservation request from a user of the hard disc recorder, on the basis of the reservation information of the contents such as shown in FIG. 4.

When the reservation information of the contents recorded according to the reservation includes the identification information of the requesting hard disc recorder, the CPU 140 decides that the contents recorded is to be transferred to the requesting hard disc recorder and sends the contents to the requesting hard disc recorder through the LAN or the wide area network (step S306).

The hard disc recorder is in the waiting state until the transfer of the whole contents is ended (step S307). When the transfer is completed, the CPU 140 of the requested hard disc recorder controls the various portions of the hard disc recorder to delete the file of the transferred contents from the hard disc 118 thereof (step S308) and the processing shown in FIG. 9 is ended. When, in the processing in step S305, the reservation information of the contents recorded according to the reservation does not include the identification information of the requesting hard disc recorder, the CPU 140 of the requested hard disc recorder decides that the contents recorded is not to be transferred and the processing shown in FIG. 9 is ended.

As described, a hard disc recording device can vicariously perform the video recording on the basis of the reservation information from another recording device. When the hard disc recorder records the contents on the basis of the reservation information from the other recording device, the recorded contents is transferred to the other hard disc recorder and is deleted from the hard disc of the hard disc recorder, which performed the video recording.

Therefore, the requesting recording device, which transmits the reservation information, can obtain the same result as that obtained when it practically performs the recording of the contents. Further, for the contents (TV broadcast program), which can not be recorded by the requesting hard disc recorder due to that it can not selectively receive the aimed broadcast signal, it is possible to obtain the same result as that obtained in the case where the other recorder records the aimed TV broadcast program.

Figure 10:
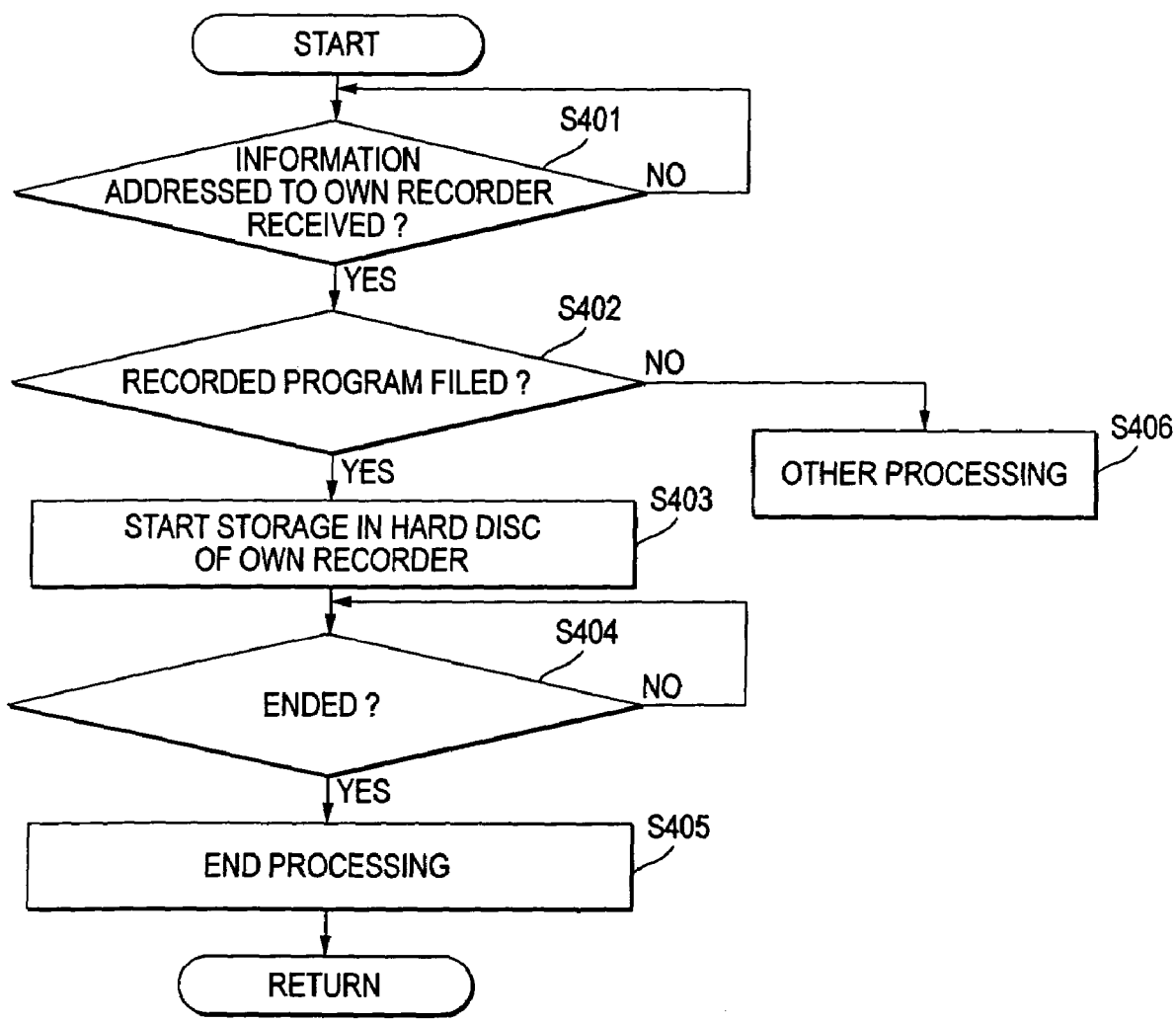
FIG. 10 is a flowchart of a processing in a hard disc recorder, which requests reservation of video recording.

Processing in Hard Disc Recorder Provided with Contents Recorded by Other Recorder Now, a processing in a requesting hard disc recorder, which is provided with a TV broadcast program recorded by a requested hard disc recorder according to a request from the requesting hard disc recorder, will be described. FIG. 10 is a flowchart of the processing in a requesting hard disc recorder according to this embodiment, which requests another hard disc recorder to execute a reservation vicariously.

The CPU 140 of the requesting hard disc recorder, which requests another recorder to perform a reservation of video recording through the reservation processing shown in FIG. 5, executes the processing for reception of information shown in FIG. 10. It is decided whether or not the information addressed to the requesting hard disc recorder is received through a LAN to which the requesting hard disc recorder is connected (step S401) and, when it is decided that the information is not received, the step S401 is repeated. That is, the requesting hard disc recorder becomes in a waiting state for the information addressed thereto.

When it is decided in the step S401 that the information addressed to the requesting hard disc recorder is received, the CPU 140 of the requesting hard disc recorder decides whether or not the received information is data (program file) of a TV broadcast program from the requested hard disc recorder (step S402). By the processing in the step S402, it is possible to decide whether or not the received information is the data of the TV broadcast program from the requested recorder on the basis of information indicating kind of information contained in a header information of the received information addressed to the requesting recorder, information indicating the requested recorder and a reservation information of the requesting hard disc recorder such as shown by (A1) in FIG. 4.

When, in the processing in step S402, it is decided that the received information is data of a TV broadcast program from the requested recorder, the CPU 140 of the requesting hard disc recorder controls various portions thereof to start a storing operation for storing the TV broadcast program (program file) in its hard disc 118 (step S403). Then, it is decided whether or not the storing of the TV broadcast program data in the hard disc is ended (step S404). When the data storing is not ended yet, the processing in the step S404 is repeated and the recorder becomes in a waiting state until the storing of the TV broadcast program is ended.

When, in the processing in the step S404, it is decided that the storing of the TV broadcast program provided by the requested recorder is ended, an ending processing such as closing of the file in the hard disc 118 is executed (step S405) and the processing shown in FIG. 10 is ended. Incidentally, when it is decided in the step S402 that the received information addressed to the requesting recorder is not the TV broadcast program data from the requested recorder, other processing corresponding to the received information is performed (step S406).

Therefore, the requesting hard disc recorder can force another recorder connected to the same LAN to perform the reservation of video recording to thereby perform the video recording processing without actually performing the recording processing by the requesting hard disc recorder and can freely utilize the TV broadcast program data by obtaining it from the requested hard disc recorder and storing it in the hard disc 118 of the requesting hard disc recorder.

As described, according to this embodiment, a hard disc recorder connected to a LAN or a predetermined wide area network can request another hard disc recorder connected to the same LAN or the same predetermined wide area network to vicariously perform a recording of a TV broadcast program provided by TV broadcast signal, which can not be selectively received by the hard disc recorder, by transferring a reservation request from the hard disc recorder to the other hard disc recorder. Therefore, it is possible to perform a reservation of recording of broadcast program provided by broadcast signal, which can not be received by the hard disc recorder.

Since the TV broadcast program data vicariously recorded by the other hard disc recorder is transferred to the hard disc recorder and stored therein after the recording is completed and then the data in the hard disc 118 of the other hard disc recorder is erased, there is no case where the same data are stored in both of the hard disc recorders, so that storage areas of the hard discs of the hard disc recorders are not used uselessly.

Another Example of Other Processing in Hard Disc Recorder

In the case of the processing performed in the hard disc recorder as described with reference to FIG. 5 to FIG. 10, the TV broadcast program data vicariously recorded by the other hard disc recorder is transferred to the hard disc recorder and, after the data is stored in the hard disc recorder, the data in the other hard disc recorder is deleted.

Depending upon circumstances, there may a case where the TV broadcast program data vicariously recorded by the requested hard disc recorder is to be left as it is. For example, in a case where usable memory area of the hard disc of the requesting hard disc recorder is small while usable memory area of the hard disc of the requested hard disc recorder is enough, it is preferable that the TV broadcast program data vicariously recorded by the requested hard disc recorder is left in the requested hard disc recorder.

The reception processing of reservation of video recording in the requesting hard disc recorder, which is described with reference to FIG. 5, and the reception processing of information addressed to the requesting hard disc recorder in the requested hard disc recorder, which is described with reference to FIG. 8, are performed as described above. However, as to (1) video recording processing of TV broadcast program, which is vicariously performed (2) processing for requesting a provision of TV broadcast program obtained by vicariously performed video recording processing, and (3) processing for providing TV broadcast program obtained by vicariously performed video recording processing, these processing may be performed as follows.

Figure 11:
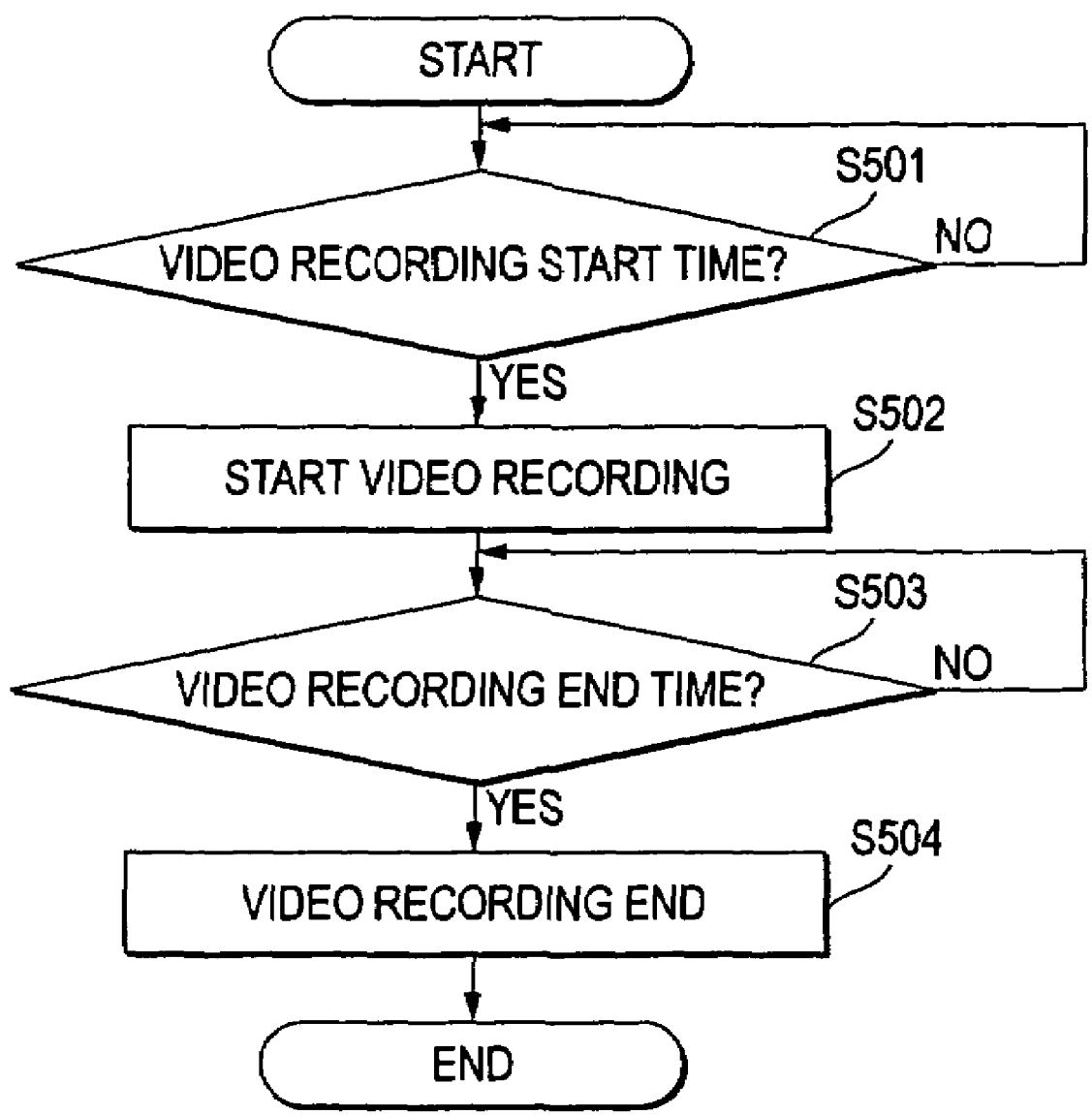
FIG. 11 is a flowchart of a recording processing performed according to transferred recoding reservation information.

(1) Another Example of Vicariously Performed Video Recording Processing of TV Broadcast Program FIG. 11 is a flowchart of a video recording processing performed in the requested hard disc recorder correspondingly to the transferred reservation information. The processing shown in FIG. 11 is performed in a case where a reproducing processing is not performed in the hard disc recorder 1 in which a video recording is reserved and the hard disc recorder is in a waiting state for recording processing, as in the case shown in FIG. 9. This processing is equally performed in hard disc recorders, which accept reservation requests.

The CPU 140 of the hard disc recorder according to this embodiment, which is in the waiting state for the video recording processing, decides whether or not it becomes a time instance at which the video recording of a TV broadcast program is started, by comparing a video recording start time of the program setting information stored in the EEPROM 143 thereof with a current time provided by a timer 146 (step S501).

When it is decided in the step S501 that it is still before the video recording start time, the processing in the step S501 is repeated and the waiting state of the hard disc recorder continues until it becomes the recording start time. When it is decided in the step S501 that it becomes the video recording start time, the CPU 140 of the hard disc recorder controls various portions thereof according to the reservation information and starts the video recording of the TV program set (step S502).

Then, the CPU 140 decides whether or not it becomes a video recording end time of the reservation information by comparing the video recording end time of the reservation of video recording stored in the EEPROM 143 thereof with a current time provided by the timer 146 (step S503).

When it is decided in the processing in step S503 that it is before the video recording end time, the processing in step S503 is repeated while continuing the video recording processing and the hard disc recorder becomes in the waiting state until it becomes the video recording end time. When, in the processing in step S503, it is decided that it becomes the video recording end time of the broadcast program, the CPU 140 controls the various portions of the hard disc recorder to terminate the video recording of the TV broadcast program (step S504).

As described, although the processing shown in FIG. 11 is the video recording processing responding to the reservation information provided from the requesting hard disc recorder, the processing shown in FIG. 11 is performed in the same way as that in the reservation of recording performed in the requesting recorder. That is, after the reserved TV broadcast program is stored in the hard disc 118 thereof, the recording processing is ended on the basis of the reservation information stored in the EEPROM 143 of the requesting hard disc recorder, the hard disc recorder becomes waiting state until an instruction is received without performing automatic transfer.

Thus, even when the video recording is performed in response to the reservation information provided from the requesting hard disc recorder, the reserved TV broadcast program data is stored in the hard disc of the requested hard disc recorder.

(2) Processing for Requesting Provision of TV Broadcast Program Obtained by Vicariously Performed Video Recording Processing Now, a processing, which is executed in the requesting hard disc recorder when the requesting hard disc recorder is provided with TV program data obtained by the video recording processing performed vicariously by the requested hard disc recorder on the basis of the reservation information from the requesting hard disc recorder as described with reference to FIG. 9, will be described.

Figure 12:
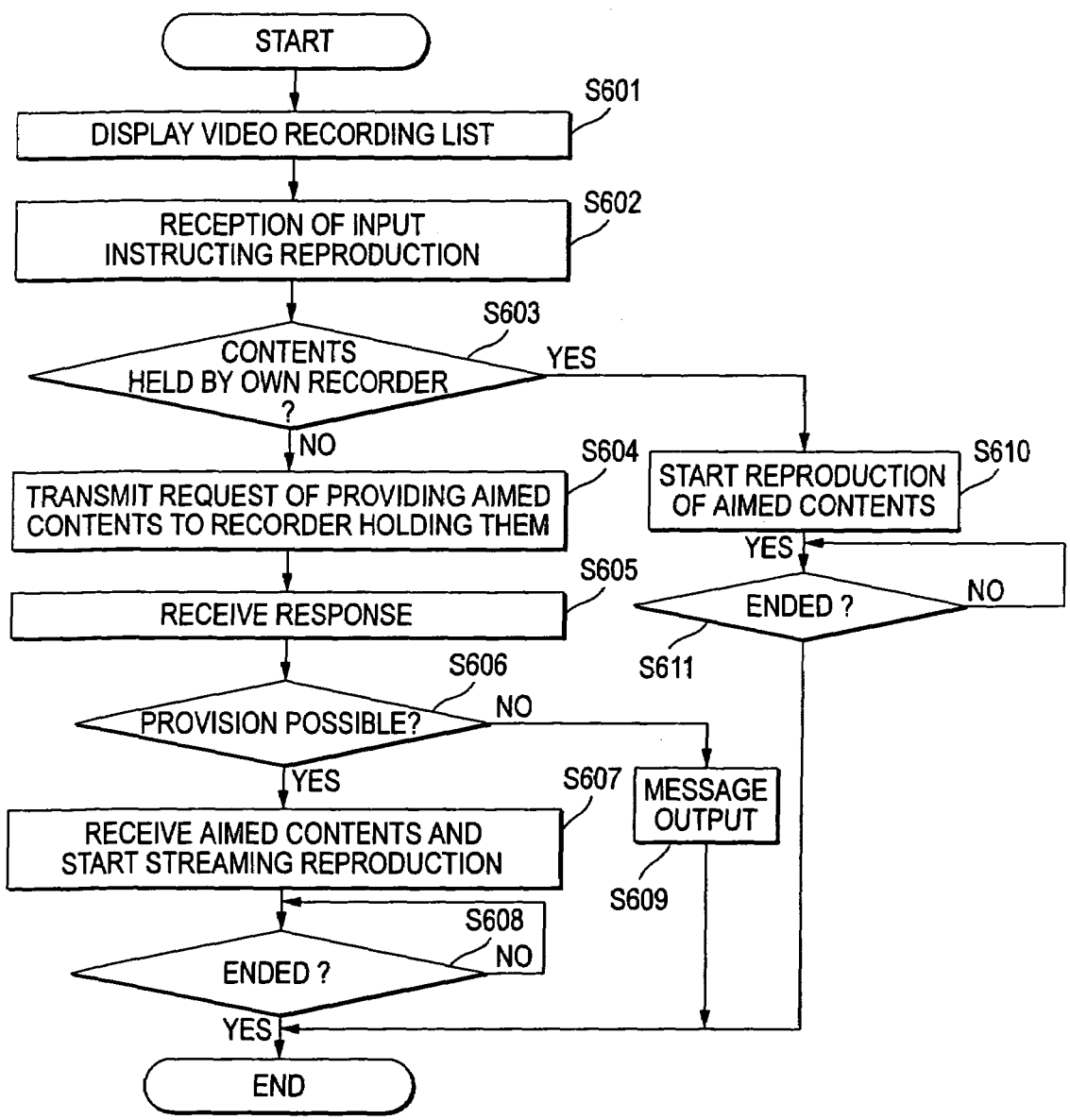
FIG. 12 is a flowchart of a processing performed in the hard disc recorder 1, which requests the recording.

FIG. 12 is a flowchart of the processing to be performed in the requesting hard disc recorder when a provision of TV broadcast program obtained by the vicariously performed video recording processing is requested by the requesting hard disc recorder. The processing shown in FIG. 12 is executed when predetermined operation for reproducing contents already stored in the hard disc 118 is performed.

By performing the predetermined operation for reproducing the contents stored in the hard disc 118, the video recording list is produced on the basis of the video recording list data in, for the EEPROM 143 or the hard disc 118 and supplied to the OSD circuit 125 so that the video recording list is displayed on the display screen of the monitor connected to the requesting hard disc recorder under control of the CPU 140 (step S601).

In this case, the video recording list data in the EEPROM 143 or the hard disc 118 includes data stored in the hard disc 118 of the requesting hard disc recorder and information for TV broadcast program (contents) stored in the hard disc of the requested hard disc recorder, which is recorded on the basis of the reservation information transferred from the requesting hard disc recorder to the requested hard disc recorder, and these data can be notified the user by distinction of areas in which these data are located.

Then, under control of the CPU 140, a reproduction instruction input (including selection input) of the aimed contents from the user through the remote controller 145 and the remote controlling signal receiving portion 144 is accepted (step S602) and it is decided whether or not the contents whose reproduction is instructed is held in the hard disc 118 of the requesting hard disc recorder (step S603).

When it is decided in the step S603 that the contents to be reproduced is not held in the hard disc 118 of the requesting hard disc recorder but in the hard disc of the requested hard disc recorder, the provision request of the aimed contents is transmitted to the requested hard disc recorder, in which the contents is held, through LAN (step S604). In this case, the destination of the provision request of the contents is the requested hard disc recorder, which performed the recording on the basis of the reservation information transferred from the requesting hard disc recorder.

Then, a response from the requested hard disc recorder, which transmits the provision request of the contents, is received (step S605) and, on the basis of the received response, it is decided whether or not the provision of the required contents is possible (step S606) In this case, as will be described later, when the provision of required contents in the requested hard disc recorder is possible, a response of possible provision is returned. When no required contents exist in the requested hard disc recorder or when the required contents can not be provided since the requested hard disc recorder is performing other processing, a response of impossibility of contents provision is returned. Therefore, it is possible to discriminate the situation according to this response.

When, in the processing in the step S606, it is decided that the response indicating that the provision of contents is possible is received, the aimed contents transmitted through LAN (in this case, vicariously recorded TV broadcast program data) is received and the so-called streaming reproduction for reproducing it sequentially is started under control of the CPU 140 (step S607).

Then, it is decided whether or not phenomenon such as completion of receiving and reproduction of all data of the aimed contents or a reception of instruction for stopping the streaming reproduction, with which the streaming reproduction is ended, (step S608). When there is no such phenomenon, the processing from the step S608 is repeated and the operation becomes a waiting state until the ending phenomenon occurs. When it is decided in the processing in the step S608 that the ending phenomenon occurs, the streaming reproduction is ended and the processing shown in FIG. 12 is ended.

When, in the processing in the step S606, it is decided that the response indicates impossibility of contents provision, a message that the provision of requested contents is impossible is output on the basis of the received response (step S609) and the processing shown in FIG. 12 is ended under control of the CPU 140.

In the processing in the step S609, it is possible to display the display message on the display screen of the monitor receiver through the ODS 125, the NTSC encoder 126 and the analog video output terminals 127 and 128 or to output warning sound and voice message from an external loud speaker through the A/D converter 121 and the analog audio output terminal 122.

Further, the impossibility of contents provision may be notified through a message display by an LCD (Liquid Crystal Display) provided in the hard disc recorder, optical warning by ON and OFF control of LED's (Light Emitting Diodes) or sound warning generated by controlling sound generator such as buzzer provided in the hard disc recorder.

When, in the processing in the step S603, the contents, which are requested to be reproduced, is decided as stored in the hard disc 118 of the requesting hard disc recorder, the aimed contents is read out from the hard disc 118 of the requesting hard disc recorder and the processing for reproducing it is started under control of the CPU 140 (step S610).

Then, it is decided whether or not phenomenon such as completion of reproduction of all data of the aimed contents or a reception of instruction for stopping reproduction of the contents occurs, with which the reproduction is ended, (step S611). When there is no such phenomenon, the processing from the step S611 is repeated and the operation becomes a waiting state until the ending phenomenon occurs. When it is decided in the processing in the step S611 that the ending phenomenon occurs, the reproduction of contents is ended and the processing shown in FIG. 12 is ended.

As described, the requesting hard disc recorder is provided with data of the TV broadcast program, which is vicariously recorded by the requested hard disc recorder through LAN, and can perform the streaming reproduction thereof.

Figure 13:
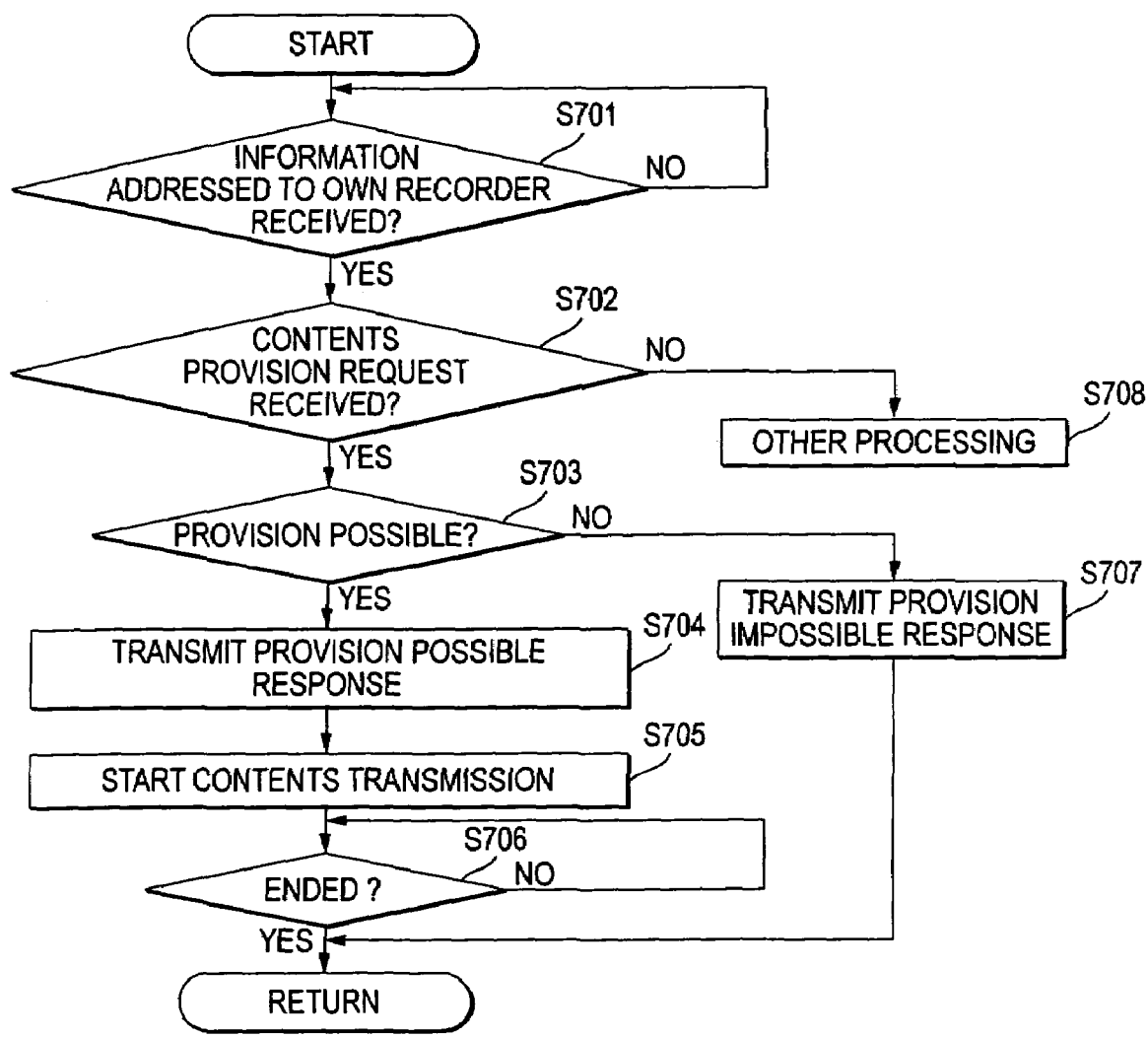
FIG. 13 is a flowchart of a processing of provision of TV broadcast program to a requesting hard disc recorder.

(3) Processing for Providing TV Broadcast Program Obtained by Vicariously Performed Video Recording Processing Next, the processing for provision of TV broadcast program, which is vicariously recorded by the requested hard disc recorder according to the transferred reservation information, in response to the provision request of the contents from the requesting hard disc recorder will be described. FIG. 13 is a flowchart for executing the provision processing of TV broadcast program, which is vicariously recorded by the requested hard disc recorder to the requesting hard disc recorder.

Each of the hard disc recorders connected to LAN and each of the recording devices such as hard disc recorders, which are connected to a wide area network and are in cooperative relation to the hard disc recorders connected to LAN, are in state where information addressed thereto can be received and in waiting state until the information is received (step S701). When it is decided in the step S701 that any one of the hard disc recorders and the recording devices receives information addressed thereto, it is decided whether or not the received information is a contents provision request under control of the CPU 140 thereof (step S702).

When it is decided in the step S702 that the information is the contents provision request, it is decided by referring to, for example, a directory of the hard disc 118 thereof whether or not the requested contents exists therein and the hard disc recorder is in a state in which the provision of the contents is possible, under control of the CPU 140 thereof (step S703).

When it is decided in the step S703 that the provision is possible, a provision possible response is produced and the response is transmitted to the requesting hard disc recorder through LAN or wide area network, under control of the CPU 140 (step S704). Then, the requested contents is read out from the hard disc 118 and transmission thereof to the requesting hard disc recorder through LAN or wide area network is started under control of the CPU 140 (step S705).

Then, it is decided whether or not the transmission of all data of the requested contents is ended (step S706) and, when it is not ended yet, the hard disc recorder becomes waiting state by repeating the operation from the step S706, under control of the CPU 140. When it is decided in the step S706 that the transmission of all data of the contents is ended, the processing shown in FIG. 13 is ended.

When it is decided in the step S703 that the provision of the requested contents is impossible because, for example, the requested contents does not exist in the hard disc 118 or other processing is being performed though there is the requested contents in the hard disc 118, a response of impossibility of provision is produced and the provision impossible response is transmitted to the requesting hard disc recorder through LAN or wide area network under control of the CPU 140 (step S707) and the processing shown in FIG. 13 is ended.

When it is decided in the step S702 that the received information addressed to the requesting hard disc recorder is not the contents provision request, other processing according to the received information is executed (step S708).

In the cases described with reference to the flowcharts shown in FIG. 11, FIG. 12 and FIG. 13, data of the TV broadcast program, which is vicariously recorded by the requested hard disc recorder, is stored in the hard disc of the requested hard disc recorder. The requesting hard disc recorder can receive the recorded data of the TV broadcast program from the requested hard disc recorder and utilize it.

In other words, the requesting hard disc recorder can utilize the hard disc of the requested hard disc recorder as if it is its own hard disc. Therefore, there is an advantage that hard disc of a hard disc recorder whose utilization rate is low can be utilized effectively.

In the cases described with reference to the flowcharts shown in FIG. 11, FIG. 12 and FIG. 13, the streaming reproduction is performed. Alternatively, it may be possible to, for example, transfer data of TV broadcast program, which is vicariously recorded by the requested hard disc recorder, to the requesting hard disc recorder in response to a request from the requesting hard disc recorder, record it in a hard disc of the requesting hard disc recorder and erase the data of the TV broadcast program in the hard disc of the requested hard disc recorder after the transfer is ended. Unlike the case where data of recorded TV broadcast program is automatically transferred to the requesting hard disc recorder immediately after the recording is completed, it is possible to realize the so-called move function with appropriate timing according to user's convenience.

Others

Incidentally, an inquiry of the requesting hard disc recorder as to whether or not a reservation of video recording in a hard disc recorder connected to LAN is possible may be sent to all recording devices connected to LAN at once and one of these recording devices, to which the request of reservation of recording containing reservation information is to be sent and which sends back affirmative response, is selected. Further, the selected recording device, which accepts the reservation information, may return the acceptance back to the requesting recording device.

In the described embodiment, when the function of the recording device is poor due to such as lack of BS/CS tuner, the reservation may be transferred to another hard disc recorder having enough function and connected to a wide area network. In the described embodiment, when the reservation of broadcast program of a local broadcasting station is to be performed, the reservation is transferred to a recording device, which is connected to the wide area network and is capable of receiving the wave from the local station. However, the present invention is not limited thereto.

For example, in the case of poor function of the hard disc recorder due to such as lack of BS/CS tuner, it may be possible to transfer the reservation to a recording device on a wide area network, which has enough function. In a case of the reservation of broadcast program from a local broadcasting station, the reservation request may be transferred to a recording device within a home network, which has a highly sensitive tuner capable of receiving the broadcasting signal from the local station.

Therefore, a recording device, which can perform a reservation according to a reservation information input by a user, may be searched in a wide range including both of a home network and wide area network and the reservation is transferred to the recording device, which is surely possible to normally record the broadcast program on the basis of the input reservation information and can appropriately perform the reservation.

Further, it may be possible to register user information of hard disc recorders and to set the priority order of the users. In such case, the reservation may be accepted according to the priority order.

In the described embodiment, hard disc recorders capable of receiving only analog terrestrial TV broadcasting and hard disc recorders capable of receiving analog terrestrial TV broadcasting, BS broadcasting and CS broadcasting are used. However, the present invention can be applied to a recording device capable of receiving radio broadcasting and a recording device capable of receiving digital terrestrial TV broadcasting, and further, the present invention can be applied to a recording device connected to a cable TV broadcasting network. In these cases, the constructions are substantially the same except portions for receiving and selecting programs.

The present invention can be used in cases where recording reservation of recordable various contents such as contents provided by terrestrial TV broadcast signal, contents provided by AM and FM radio broadcast signal, contents provided by satellite broadcasting, contents provided through wired media such as cable TV broadcasting and contents provided wide area network such as internet, etc.

Further, although the present invention has been described with reference to the embodiments, in which hard disc recorders are used, the invention is not limited thereto. For example, the present invention can be applied to cases where recording devices or recording/reproducing devices, which use optical disc such as DVD (Digital Versatile Disc) as recording medium, recording devices or recording/reproducing devices, which use optical disc such as MD (Mini Disc (registered trademark)) as recording medium or recording devices or recording/reproducing devices, which use magnetic recording medium such as magnetic tapes. That is, it is possible to apply the present invention to systems constructed with plural kinds of recording devices or recording/reproducing devices, such as systems constructed with hard disc recorders, DVD recorders and VTR's.

It should be understood by those skilled in the art that various modifications, combinations, sub-combinations and alterations may occur depending on design requirements and other factors insofar as they are within the scope of the appended claims or the equivalents thereof.

The invention claimed is:
1. A recording system, comprising:
first and second recording devices connected to a network, each of the first and second recording devices being operable to receive broadcast signals and to record program information forming a broadcast program;
the first recording device including:
reception means for receiving recording reservation information from a user,
a first memory for storing the received recording reservation information,
judgment means for judging whether the received recording reservation information is a reservation for a broadcast channel that is of a kind which is receivable by the first recording device based on at least one of receiving function information or receivable station information, the receiving function information indicating whether or not digital broadcasting is receivable by the first recording device, the receivable station information indicating whether the broadcast channel is one of a plurality of selected broadcast channels that are set as receivable channels for an inputted place of use of the first recording device at a time of use of the first recording device, and
sending means for producing a recording reservation request containing the recording reservation information and for sending the recording reservation request to the network in response to the judgment means judging that the received recording reservation information is for a broadcast channel that is of a kind which is not receivable by the first recording device;
the second recording device including:
first receiving means for receiving the broadcast channel that is of a kind which is not receivable by the first recording device,
a second memory for storing recording reservation information,
second receiving means for receiving the recording reservation request transmitted from the first recording device through the network,
reservation request reception means for storing, in the second memory, the recording reservation information contained in the recording reservation request received by the second receiving means,
reservation recording control means for recording, in a recording medium of the second recording device, the program information forming the broadcast program corresponding to the recording reservation information stored in the second memory, and
program information transmission means for transmitting the recorded program information forming the broadcast program over the network to the first recording device after the reservation recording control means completes recording of the program information forming the broadcast program,
the reservation recording control means deleting the program information forming the broadcast program from the recording medium of the second recording device after the program information transmission means completes the transmission of the program information forming the broadcast program;

the first recording device including:
  third receiving means for receiving the program information forming the broadcast program transmitted over the network by the second recording device, and
  recording control means for recording, in a recording medium of the first recording device, the received program information forming the broadcast program.

2. A recording system as claimed in claim 1, wherein the first recording device further includes:
  provision request transmission means for transmitting to the second recording device a provision request for the program information forming the recorded broadcast program;
  the program information transmission means of the second recording device transmitting to the first recording device the program information forming the broadcast program recorded in the recording medium of the second recording device in response to the provision request being received.

3. A recording system, comprising:
  first and second recording devices connected to a network, each of the first and second recording devices being operable to receive broadcast signals and to record program information forming a broadcast program;
  the first recording device including:
    reception means for receiving recording reservation information from a user,
    a first memory for storing the recording reservation information,
    first judgment means for judging whether the received recording reservation information is a reservation for a broadcast channel that is of a kind which is receivable by the first recording device based on at least one of receiving function information or receivable station information, the receiving function information indicating whether or not digital broadcasting is receivable by the first recording device, the receivable station information indicating whether the broadcast channel is one of a plurality of selected broadcast channels that are set as receivable channels for an inputted place of use of the first recording device at a time of use of the first recording device, and
    sending means for producing a recording reservation request addressed to the second recording device and containing the recording reservation information and for sending the recording reservation request to the network in response to the judgment means judging that the received recording reservation information is for a broadcast channel that is of a kind which is not receivable by the first recording device; and
  the second recording device including:
    a second memory for storing recording reservation information,
    first receiving means for receiving the recording reservation request addressed to the second recording device and transmitted through the network,
    second judgment means for judging whether the received recording reservation request is a request for a broadcast channel that is of a kind which is receivable by the second recording device based on the at least one of receiving function information or receivable station information,
    reservation request reception means for storing the recording reservation information contained in the recording reservation request in the second memory in response to the second judgment means judging the recording reservation request to be for a broadcast channel that is of a kind which is receivable by the second recording device, and
    reservation recording control means for recording, in a recording medium of the second recording device, the program information forming the broadcast program corresponding to the recording reservation information stored in the second memory, and
    program information transmission means for transmitting the recorded program information forming the broadcast program over the network to the first recording device after the reservation recording control means completes recording of the program information forming the broadcast program,
    the reservation recording control means deleting the program information forming the broadcast program from the recording medium of the second recording device after the program information transmission means completes the transmission of the program information forming the broadcast program;
  the first recording device including:
    second receiving means for receiving the program information forming the broadcast program transmitted over the network by the second recording device, and
    recording control means for recording, in a recording medium of the first recording device, the received program information forming the broadcast program.

4. A recording method for use in a system including first and second recording devices connected to a network, each of the first and second recording devices being operable to receive broadcast signals and to record program information forming a broadcast program, the method comprising:
  in the first recording device:
    receiving recording reservation information from a user,
    storing the received recording reservation information in a first memory,
    judging whether the received recording reservation information is for a broadcast channel that is of a kind which is receivable by the first recording device based on at least one of receiving function information or receivable station information, the receiving function information indicating whether or not digital broadcasting is receivable by the first recording device, the receivable station information indicating whether the broadcast channel is one of a plurality of selected broadcast channels that are set as receivable channels for an inputted place of use of the first recording device at a time of use of the first recording device, and
    producing a recording reservation request addressed to the second recording device and containing the recording reservation information and sending the recording reservation request to the network in response to the received recording reservation information being judged to be for a broadcast channel that is of a kind which is not receivable by the first recording device; and
  in the second recording device:
    receiving the recording reservation request addressed to the second recording device through the network,
    judging whether the recording reservation information contained in the recording reservation request is for a broadcast channel that is of a kind which is receivable by the second recording device,
    storing the recording reservation information contained in the recording reservation request in a second memory in response to the recording reservation information being judged to be for a broadcast channel that is of a kind which is receivable by the second recording device, recording, in a recording medium of the second recording device, the program information forming the broadcast program corresponding to the recording reservation information stored in the second memory, and after the recording of the program information forming the broadcast program has ended, transmitting the program information forming the broadcast program over the network to the first recording device, and deleting, from the recording medium of the second recording device, the program information forming the broadcast program; and in the first recording device:

receiving the program information forming the broadcast program transmitted over the network by the second recording device, and recording, in a recording medium of the first recording device, the received program information forming the broadcast program.

5. A recording method as claimed in claim 4, further comprising:

in the first recording device:

transmitting, to the second recording device, a provision request for the program information forming the recorded broadcast program; and in the second recording device:

the transmitting to the first recording device of the program information forming the broadcast program recorded in the recording medium of the second recording device being carried out in response to the provision request being received.

6. A recording device connectable to a network and being operable to receive broadcast signals and to record program information forming a broadcast program, the recording device comprising:

first receiving means for receiving recording reservation information from a user;

a memory for storing the received recording reservation information;

judgment means for judging whether the received recording reservation information is a reservation for a broadcast channel that is of a kind which is receivable by the recording device based on at least one of receiving function information or receivable station information, the receiving function information indicating whether or not digital broadcasting is receivable by the recording device, the receivable station information indicating whether the broadcast channel is one of a plurality of selected broadcast channels that are set as receivable channels for an inputted place of use of the recording device at a time of use of the recording device;

sending means for producing a recording reservation request containing the recording reservation information in response to the judgment means judging that the received recording reservation information is for a broadcast channel that is of a kind which is not receivable by the recording device, and for sending the recording reservation request over the network to another recording device which is able to receive the broadcast channel and which records the program information forming the broadcast program corresponding to the recording reservation information on response to receiving the recording reservation request;

second receiving means for receiving the program information forming the broadcast program over the network from the another recording device after the another recording device completes recording of the program information forming the broadcast program, the another recording device thereby deleting the recorded program information forming the broadcast program after completing transmission of the program information forming the broadcast program; and recording control means for recording, in a recording medium of the recording device, the received program information forming the broadcast program, the another recording device thereby deleting the program information forming the broadcast program after completing the transmission of the program information forming the broadcast program.

7. A recording device as claimed in claim 6, further comprising:

provision request transmission means for transmitting to the another recording device a provision request for the program information forming the recorded broadcast program.

8. A recording device connectable to a network and operable to receive broadcast signals and to record program information forming a broadcast program, the recording device comprising:

a memory for storing recording reservation information;

receiving means for receiving a recording reservation request transmitted to the recording device through the network from another recording device;

judgment means for judging whether recording reservation information contained in the recording reservation request is for a broadcast channel that is of a kind which is receivable by the recording device based on at least one of receiving function information or receivable station information, the receiving function information indicating whether or not digital broadcasting is receivable by the recording device, the receivable station information indicating whether the broadcast channel is one of a plurality of selected broadcast channels that are set as receivable channels for an inputted place of use of the recording device at a time of use of the recording device;

reservation request reception means for storing, in the memory, the recording reservation information contained in the recording reservation request in response to the judgment means judging the recording reservation information to be for a broadcast channel that is of a kind which is receivable by the recording device;

reservation recording control means for recording in a recording medium of the recording device the program information forming the broadcast program corresponding to the recording reservation information stored in the memory; and program information transmission means for transmitting the recorded program information forming the broadcast program over the network to another recording device after the reservation recording control means completes recording of the program information forming the broadcast program, the reservation recording control means deleting the program information forming the broadcast program from the recording medium of the second recording device after the program information transmission means completes the transmission of the program information forming the broadcast program.

9. A recording device as claimed in claim 8, wherein the program information transmitting means transmits the program information forming the broadcast program recorded in the recording medium of the recording device to the another recording device which provided the recording reservation information in response to a provision request for the program information forming the broadcast program being received by the receiving means.

* * * * *